(12) United States Patent
Lugas et al.

(10) Patent No.: US 9,393,853 B2
(45) Date of Patent: Jul. 19, 2016

(54) VENT APPARATUS

(71) Applicant: The Eastern Company, Cleveland, OH (US)

(72) Inventors: Grant A. Lugas, Elyria, OH (US); Lee S. Weinerman, Medina, OH (US)

(73) Assignee: THE EASTERN COMPANY, Cleveland, OH (US)

( * ) Notice: Subject to any disclaimer, the term of this patent is extended or adjusted under 35 U.S.C. 154(b) by 544 days.

(21) Appl. No.: 13/774,818

(22) Filed: Feb. 22, 2013

(65) Prior Publication Data

US 2013/0178142 A1     Jul. 11, 2013

Related U.S. Application Data

(63) Continuation-in-part of application No. 12/605,401, filed on Oct. 26, 2009, now Pat. No. 8,727,841.

(60) Provisional application No. 61/750,050, filed on Jan. 8, 2013.

(51) Int. Cl.
| | |
|---|---|
| *B60H 1/24* | (2006.01) |
| *F24F 7/00* | (2006.01) |
| *B60J 5/04* | (2006.01) |
| *B60H 1/26* | (2006.01) |

(52) U.S. Cl.
CPC .............. *B60H 1/248* (2013.01); *B60H 1/262* (2013.01); *B60J 5/0491* (2013.01); *B60H 1/267* (2013.01)

(58) Field of Classification Search
CPC ........... F16F 1/122; F16F 1/123; F16F 1/125; F16F 1/126; F16F 1/128; F16F 1/13

USPC ......... 454/118, 128, 134, 136, 142, 143, 145, 454/149, 154, 155, 273, 89, 86, 94, 95, 96, 454/97; 267/170, 173, 179, 262, 265, 271; 49/326, 340, 346, 401

See application file for complete search history.

(56) References Cited

U.S. PATENT DOCUMENTS

| | | | | |
|---|---|---|---|---|
| 1,412,613 | A | * | 4/1922 | Henvis ........................ 454/149 |
| 2,093,036 | A | * | 9/1937 | Dickason ..................... 454/149 |
| 3,046,865 | A | | 7/1962 | Kelly |

(Continued)

FOREIGN PATENT DOCUMENTS

| | | | |
|---|---|---|---|
| CN | 1205953 A | | 1/1999 |
| GB | 2025795 A | * | 1/1980 |
| JP | 09112153 A | * | 4/1997 |

OTHER PUBLICATIONS

Tranlation of Abstract of JP409112153A.*

(Continued)

*Primary Examiner* — Avinash Savani
*Assistant Examiner* — Vivek Shirsat
(74) *Attorney, Agent, or Firm* — Walker & Jocke

(57) ABSTRACT

A vent apparatus (10, 600) includes a perforated screen (12), a door (18), and a handle. The screen includes hexagonally shaped perforations (15). The door is adjacent a first face (13) of the screen and includes at least one arm (20, 22) that extends through at least one slot in the screen. The handle is in operative connection with the at least one arm and is operative to cause the door to move between a closed position (62) adjacent the screen to one of a plurality of open positions (64) extending at an acute angle with respect to the screen.

21 Claims, 40 Drawing Sheets

(56) References Cited

U.S. PATENT DOCUMENTS

| | | | |
|---|---|---|---|
| 3,102,464 A | 9/1963 | Kelly et al. | |
| 3,358,576 A | 12/1967 | Kelly et al. | |
| 3,375,772 A | 4/1968 | Kelly et al. | |
| 3,625,132 A * | 12/1971 | Smith | 454/145 |
| 3,760,707 A | 9/1973 | Kelly | |
| 3,839,950 A | 10/1974 | Kelly et al. | |
| 4,452,129 A | 6/1984 | Kelley et al. | |
| 4,519,645 A | 5/1985 | Kelly et al. | |
| 4,522,115 A | 6/1985 | Kelly et al. | |
| 5,020,425 A | 6/1991 | Kelly | |
| 5,137,327 A | 8/1992 | Edmonds et al. | |
| 5,370,576 A | 12/1994 | Krofchalk | |
| 5,605,238 A * | 2/1997 | Jacobs | A47B 47/0091 108/180 |
| D390,943 S | 2/1998 | Kelly | |
| D393,707 S | 4/1998 | Kelly | |
| 5,766,068 A | 6/1998 | Kelly | |
| 5,797,791 A | 8/1998 | Humphrey et al. | |
| 5,983,450 A | 11/1999 | Pratt | |
| 6,106,385 A | 8/2000 | Humphrey et al. | |
| 6,126,538 A | 10/2000 | Kelly et al. | |
| 6,211,458 B1 * | 4/2001 | Mitchell et al. | 174/383 |
| 6,280,315 B1 | 8/2001 | Kelly | |
| D450,113 S | 11/2001 | Teskey | |
| 6,336,627 B1 * | 1/2002 | Fujita et al. | 267/131 |
| D459,461 S | 6/2002 | Kelly | |
| D459,462 S | 6/2002 | Kelly et al. | |
| D461,551 S | 8/2002 | Teskey | |
| 6,478,670 B2 | 11/2002 | Kelly | |
| 6,514,135 B1 | 2/2003 | Kelly | |
| 6,558,246 B2 | 5/2003 | Kelly et al. | |
| 6,602,126 B1 | 8/2003 | Teskey | |
| D483,462 S | 12/2003 | Teskey | |
| 6,932,694 B2 * | 8/2005 | Jeffries | 454/145 |
| 2011/0097983 A1 | 4/2011 | Lugas et al. | |

OTHER PUBLICATIONS

MatWeb-Asahi Kasei Leona® 14G15 15% Glass Filled Nylon 66.*
Matweb-Heat Deflection Temperature Testing of Plastics.*
Salem Vent International, Inc.; U.S. trademark registration No. 2151516; Apr. 14, 1998.

* cited by examiner

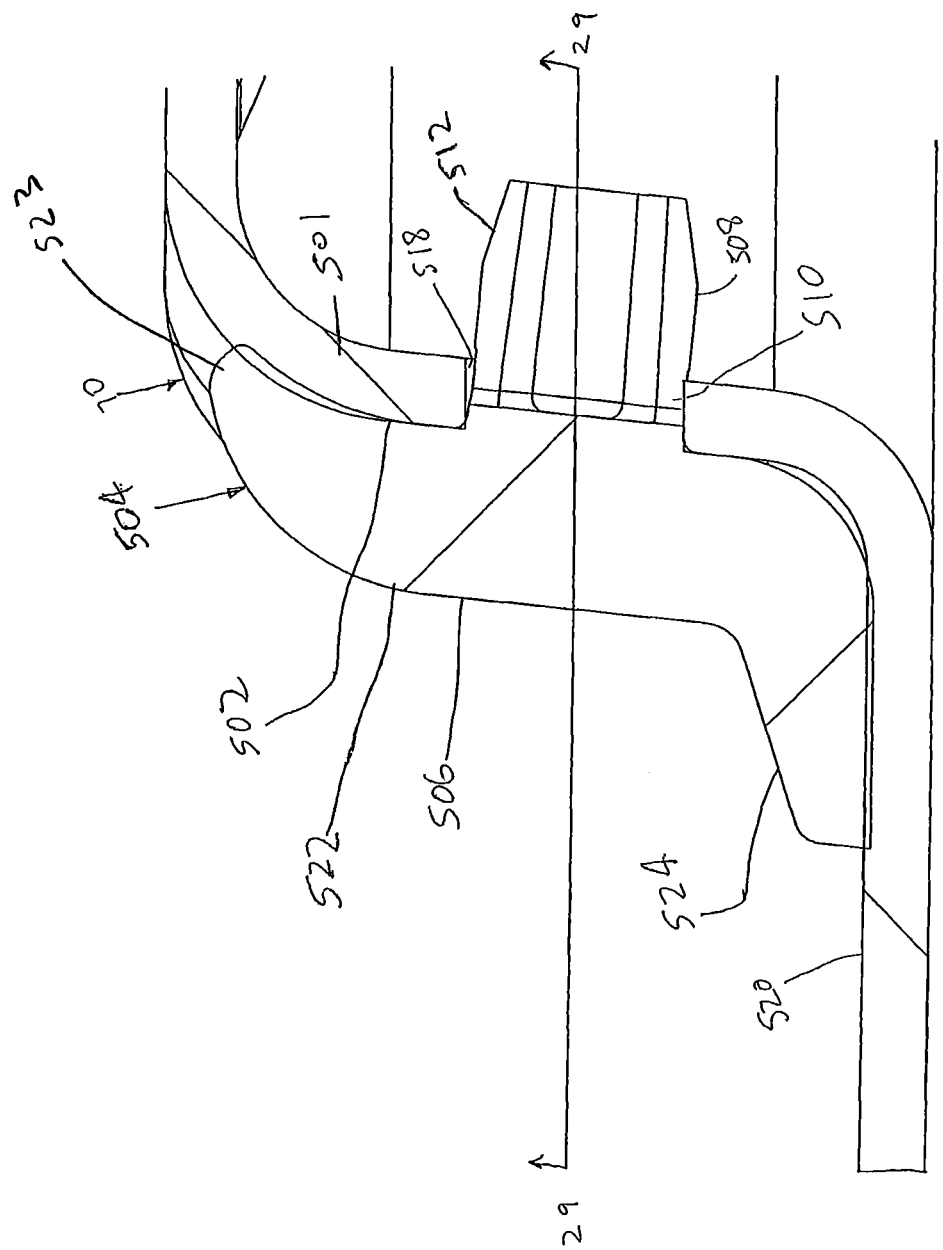

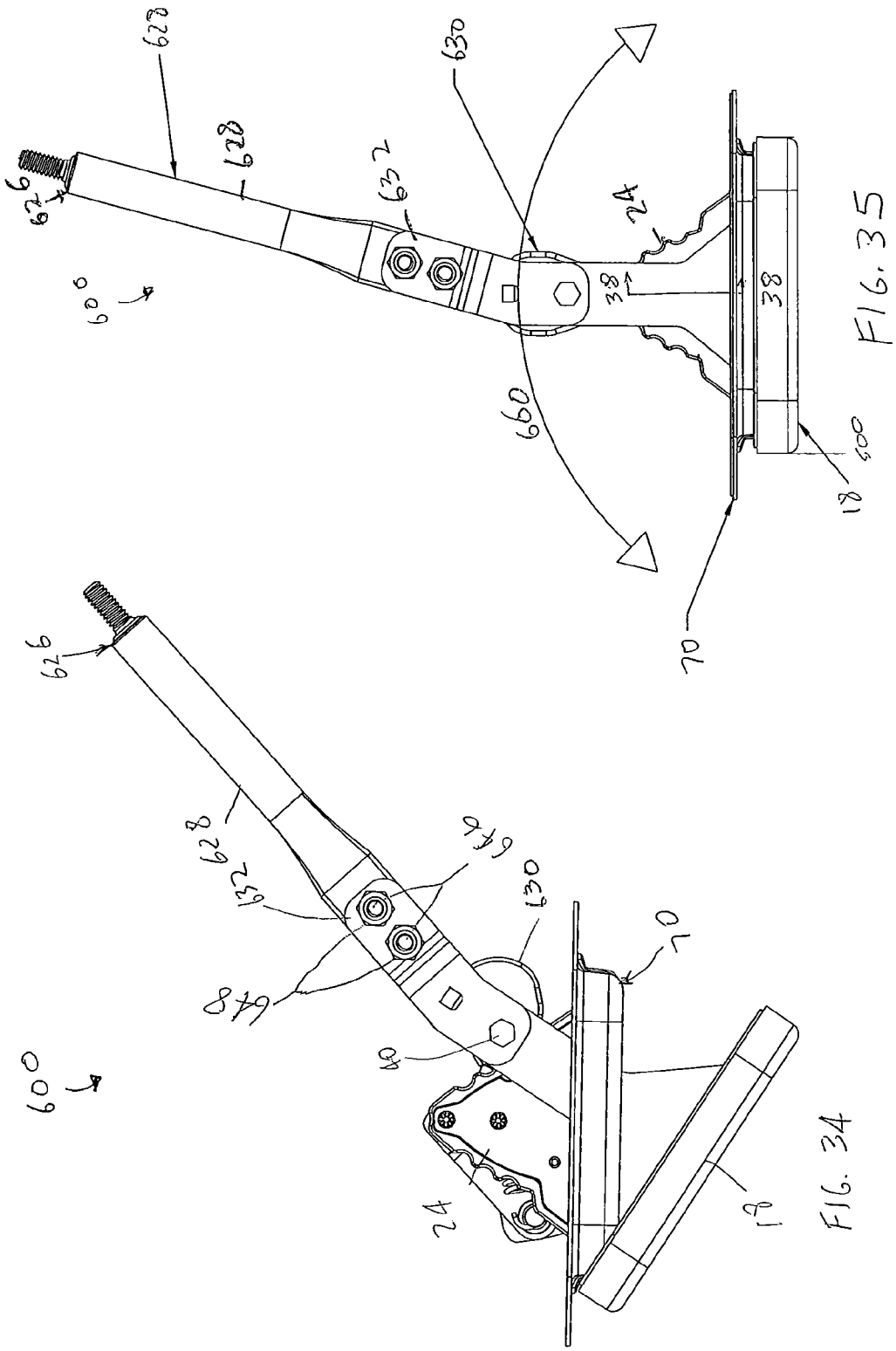

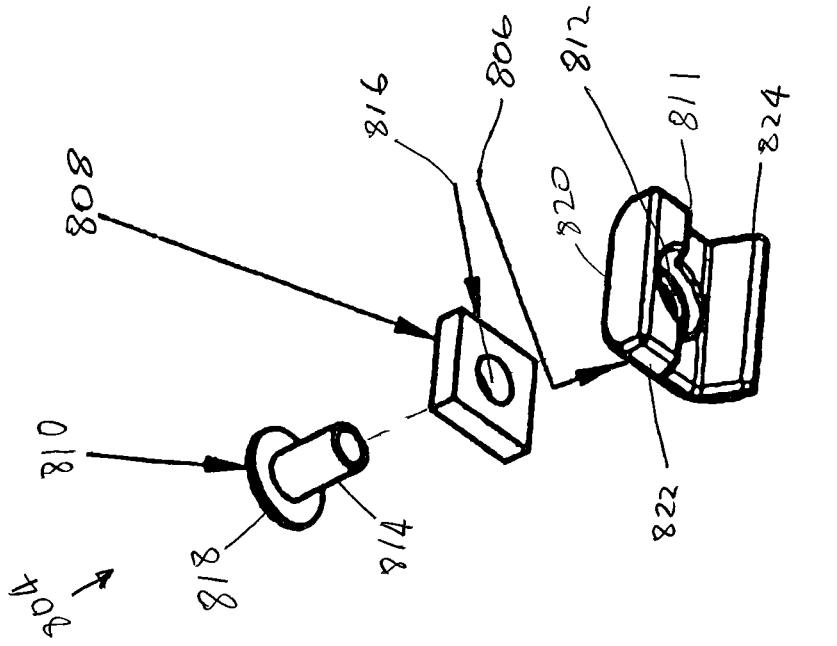
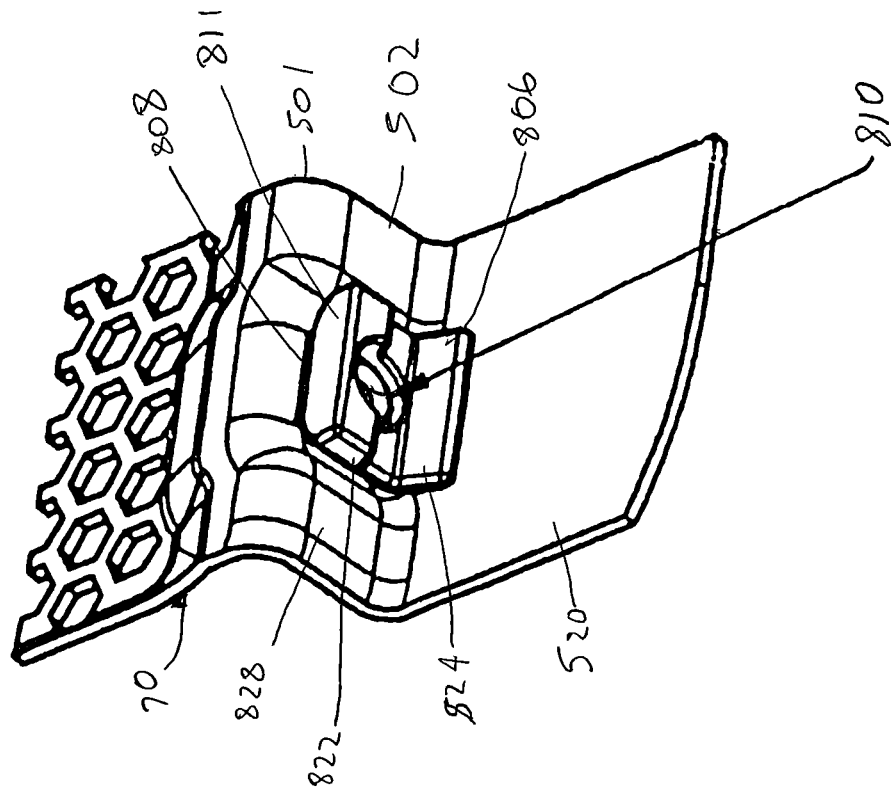
FIG. 40
FIG. 39

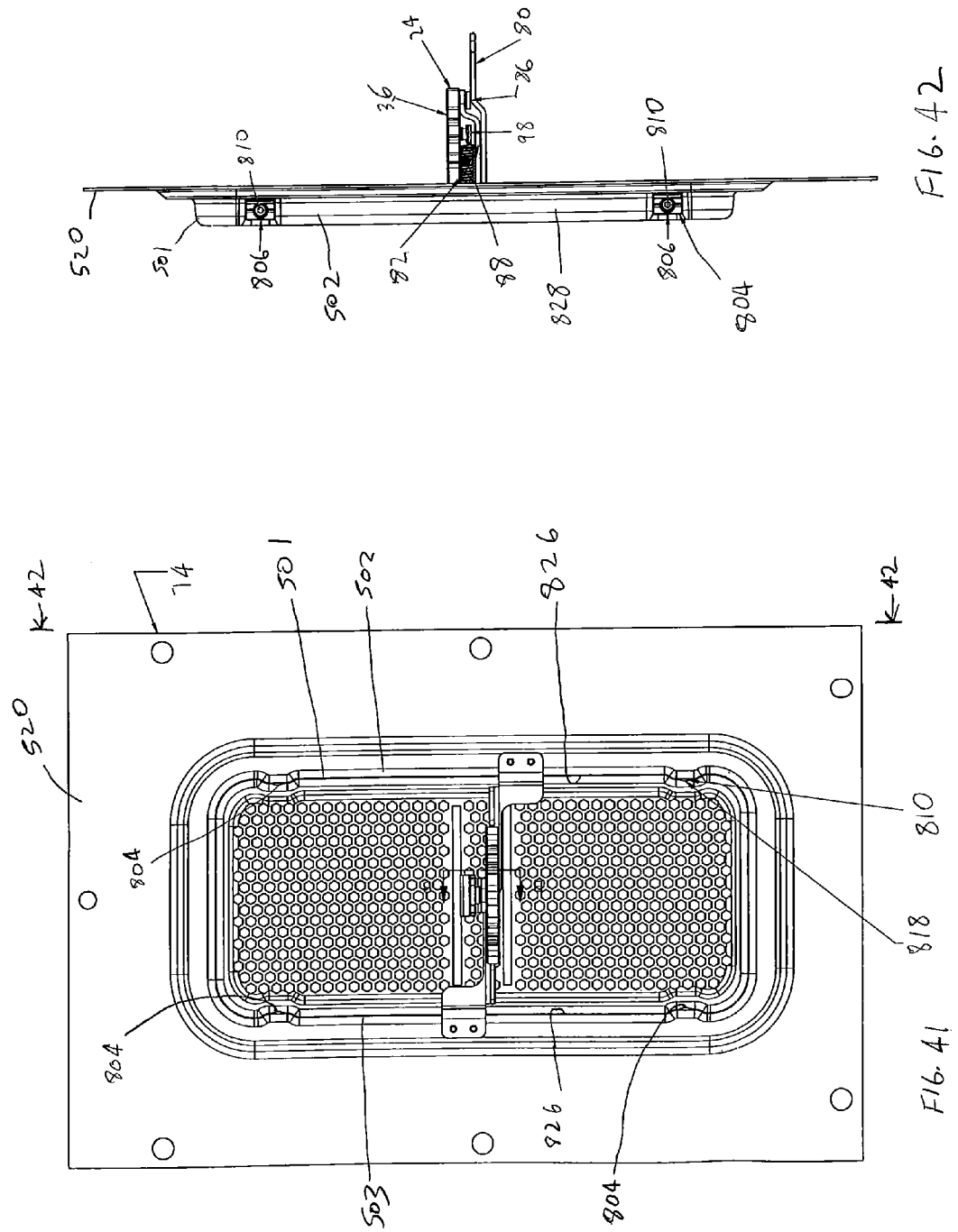

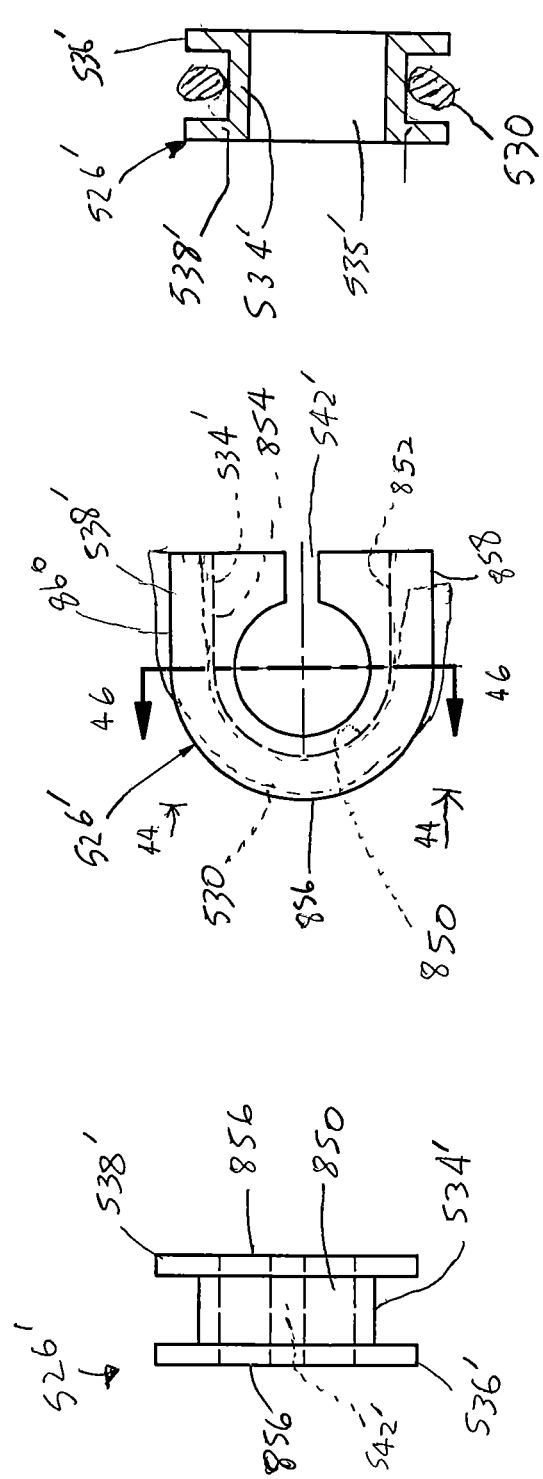

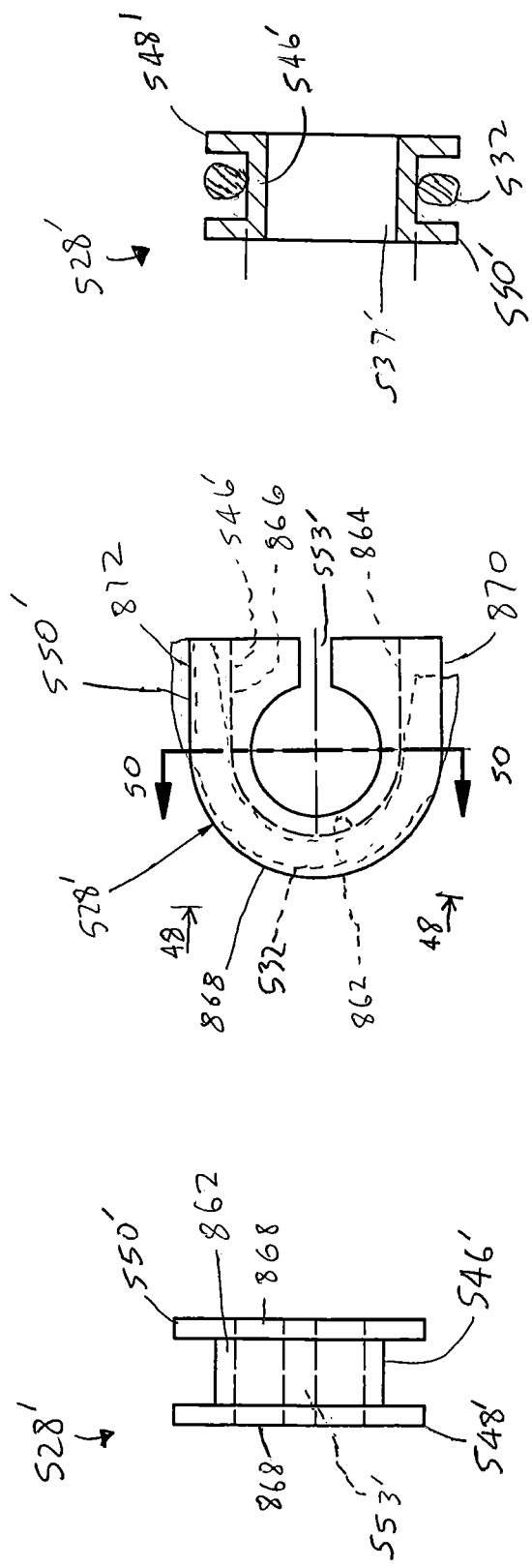

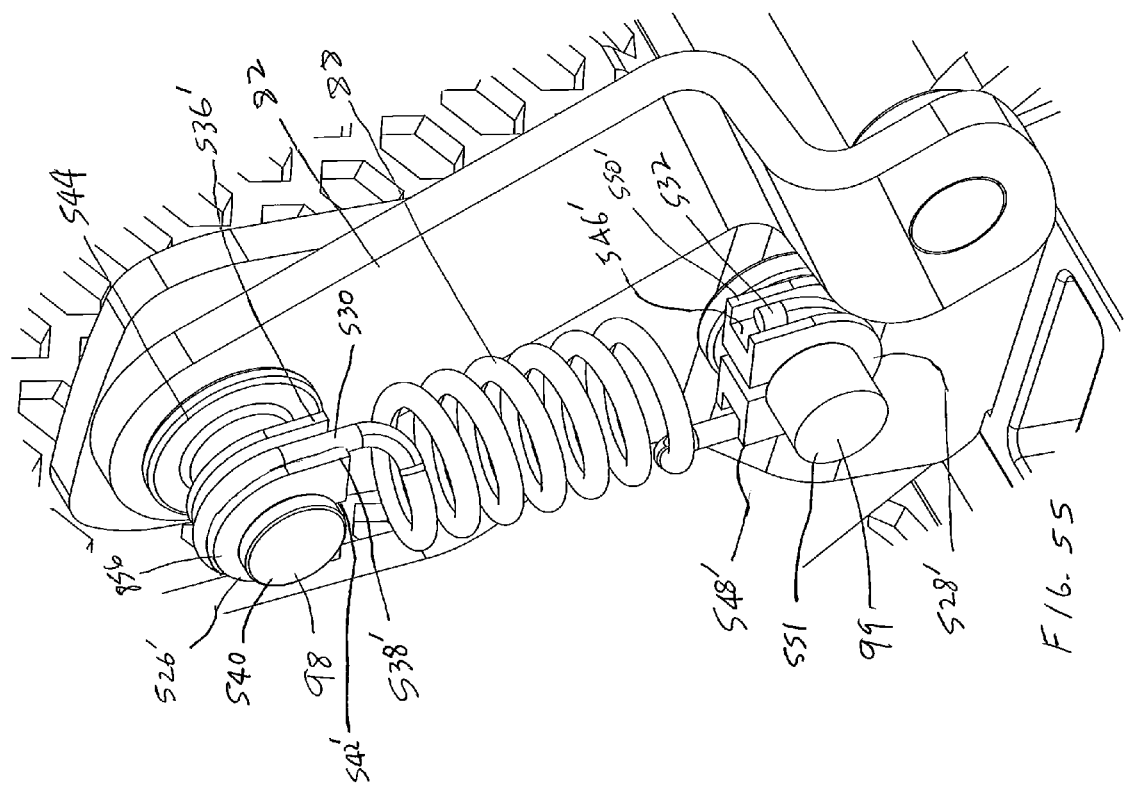
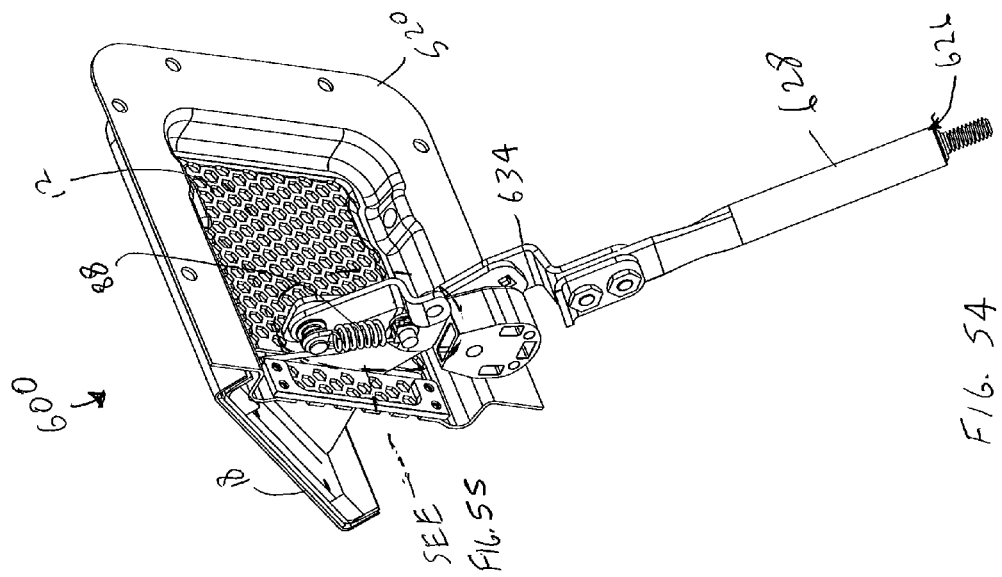

VENT APPARATUS

CROSS-REFERENCE TO RELATED APPLICATIONS

This application claims benefit under 35 U.S.C. §119(e) of Provisional Application No. 61/750,050 filed Jan. 8, 2013. The disclosure of which is incorporated herein by reference in its entirety.

BACKGROUND

A "two-way" hingeless vent is typically used in vehicles such as trucks to provide additional ventilation and cooling when a door to the vent is open. Also, when the door of the vent is closed, the door may seal the vent and prevent a flow of air and water into the vehicle through the vent. However, the compression forces used to maintain the door in a closed position as the vehicle moves, often makes such vents difficult to open. Thus, there exists a need for an improved "two-way" hingeless vent that is relatively easier to open and includes other features as will be apparent from the following description.

SUMMARY

The following is a brief summary of the subject matter that is described in greater detail herein. This summary is not intended to be limiting as to the scope of the claims.

An example embodiment of a vent apparatus (referred to herein as a "vent") may include a door that is operative to open in two different directions, so as to provide either an inflow of air into a moving vehicle or an outflow of air out of the moving vehicle. The vent may include a handle which is connected to a guide via a lever assembly. Movement of the handle to a first side of the guide, causes the door of the vent to open in a first direction (e.g., providing an inflow of air). Movement of the handle to a second opposite side of the guide, causes the door of the vent to open in a second direction (e.g., providing an outflow of air). Movement of the handle to a center position of the guide causes the door of the vent to close and prevent the inflow and outflow of air through the vent.

In an example embodiment, the guide may include a plurality of recesses (also referred to herein as "detents"). Also the handle may include a movable bolt that slides between a retracted and extended position with respect to the handle into and out of the detents. In addition, the vent may include a lever assembly. The lever assembly is adapted to maintain the handle sufficiently close to the guide (as the handle moves relative to the guide to open and close the door) such that the bolt is operative to slide along the guide into and out of the detents and move relative to the handle responsive to changes in distance between the guide and the handle.

In another aspect, a vent apparatus is provided that includes a screen. The screen includes an interior face, an opposed exterior face, a plurality of perforations therethrough, and at least one slot therethrough. The perforations are hexagonally shaped. The vent apparatus also includes a door adjacent the exterior face of the screen. The door includes at least one arm that extends through the at least one slot. The vent apparatus further includes a handle that is in operative connection with the at least one arm. The handle is operative to cause the door to move between a closed position adjacent the screen to one of a plurality of open positions extending at an acute angle with respect to the screen.

Other aspects will be appreciated upon reading and understanding the attached figures and description.

BRIEF DESCRIPTION OF THE DRAWINGS

FIG. 21 is a side view showing features of an alternative configuration of a bolt.
FIG. 28 is a partial sectional view taken along line 28-28 of FIG. 27.
FIG. 34 is a top view of the vent of FIG. 25 when the door is in the open position.

FIG. 35 is a top view of the vent of FIG. 25 when the door is in the closed position.

FIG. 39 is a front perspective view of a portion of the screen showing a bumper assembly according to another exemplary embodiment.

FIG. 40 is an exploded view of the bumper assembly of the exemplary embodiment of FIG. 39.

FIG. 41 is a back view of the vent of the exemplary embodiment of FIG. 39.

FIG. 42 is a view taken along line 42-42 of FIG. 41.

FIG. 44 is a view taken along line 44-44 of FIG. 45 but with the spring removed.

FIG. 45 is a side view of a bushing in contact with an end of the spring and facing the upper flange of the bushing of the exemplary embodiment of FIG. 43.

FIG. 46 is a sectional view taken along line 46-46 of FIG. 45.

FIG. 48 is a view taken along line 48-48 of FIG. 49 but with the spring removed.

FIG. 49 is a side view of another bushing in contact with an end of the spring and facing the upper flange of the bushing of the exemplary embodiment of FIG. 43.

FIG. 50 is a sectional view taken along line 50-50 of FIG. 45.

FIG. 54 is back perspective view of a portion of the vent of the exemplary embodiment of FIG. 43 with the alternative bushings.

FIG. 55 is an enlarge portion of the vent as indicated in FIG. 54.

DETAILED DESCRIPTION

Figure 1:
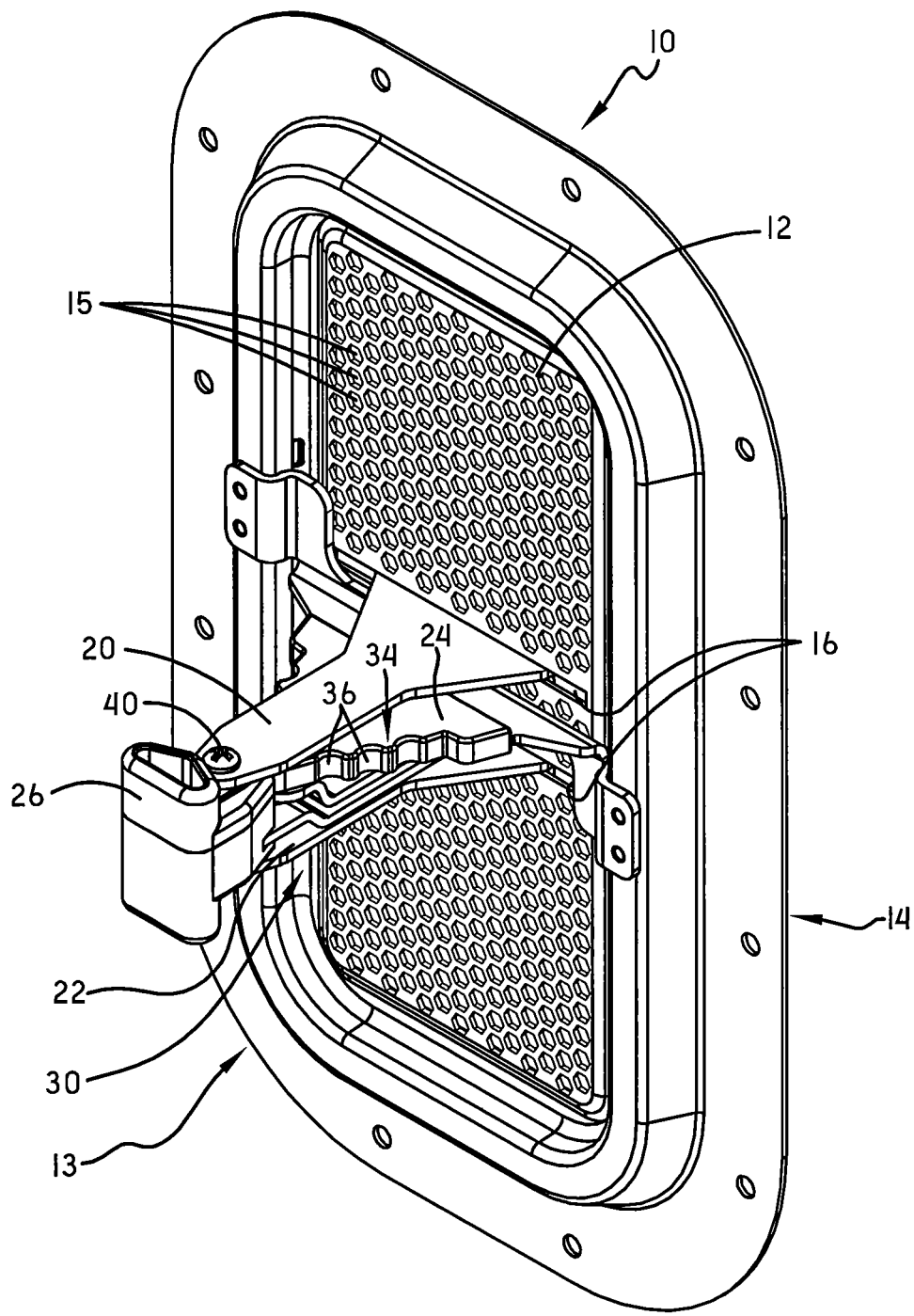
FIG. 1 is a perspective view of an example embodiment of a vent.

Various technologies pertaining to a vent apparatus will now be described with reference to the drawings, where like reference numerals represent like elements throughout.

With reference to FIG. 1, a back or rear view of an example embodiment of a vent apparatus (or "vent") 10 is illustrated. The vent 10 may include a perforated screen 12 having an interior face 13 and a corresponding exterior face (not shown in FIG. 1, but generally indicated as a face 14 located on the opposite side of the screen 12).

The screen 12 may correspond to a plate or other structure that includes a plurality of perforations 15 (i.e., holes) therethrough. Such perforations may correspond to small circular, hexagonal or other shaped holes created in the plate.

Figure 24:
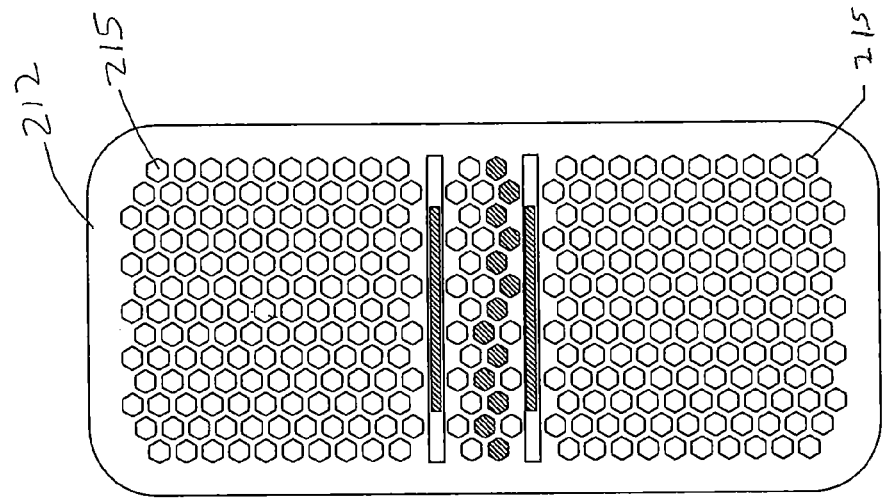
FIG. 24 is a front view of a portion of an alternative screen of another exemplary embodiment showing the perforations.
Figure 23:
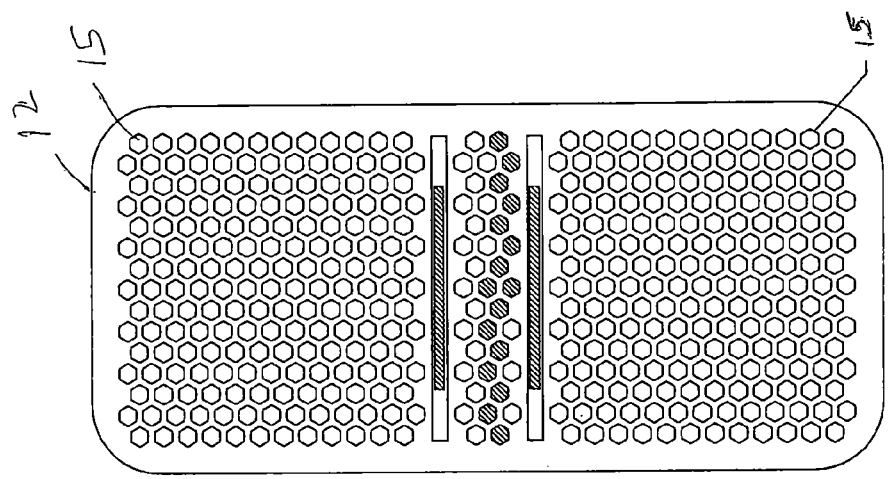
FIG. 23 is a front view of a portion of the screen of the exemplary embodiment of FIG. 1.
Figure 22:
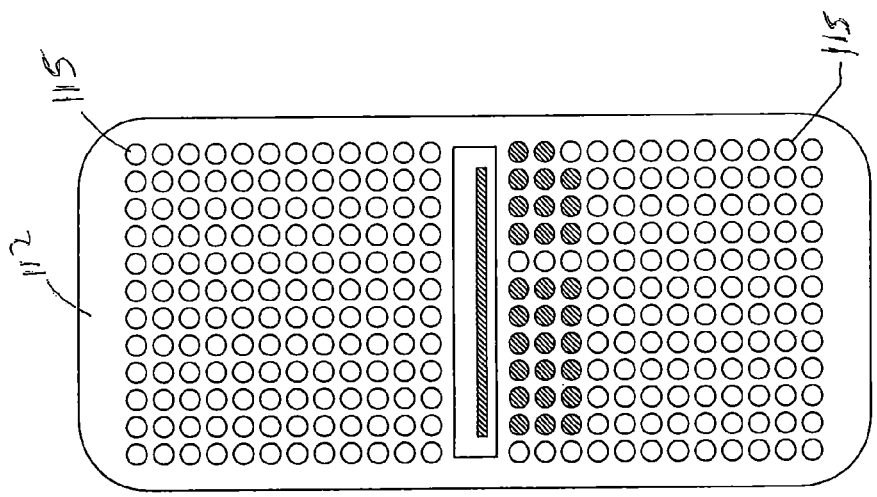
FIG. 22 is a front view of a portion of an alternative screen of another exemplary embodiment showing the perforations.

FIGS. 22-24 show various configurations of the perforations on the screen. For each of the configurations, the screen is the same size. FIG. 22 shows circular perforations 115 in the screen 112. Each circular perforation 115 occupies an area of 0.0314 in$^2$. The circular perforations 115 are arranged in horizontal rows and vertical columns. In this arrangement, the total open air flow area is 10.32 in$^2$, the obstructed area is 1.17 in$^2$, and the usable area is 9.15 in$^2$. FIG. 23 shows hexagonal perforations 15 on the screen 12 as depicted in the example embodiments of FIGS. 1-21. Each hexagonal perforation 15 occupies an area of 0.0314 in$^2$. The hexagonal perforations 15 are arranged in vertical columns. The odd number columns are shifted down (as viewed in FIG. 23) at a distance that is half of the distance between adjacent perforations 15 in a column. In this arrangement, the total open air flow area is 11.58 in$^2$, the obstructed area is 0.796 in$^2$, and the usable area is 10.78 in$^2$. FIG. 24 shows hexagonal perforations 215 in the screen 212. Each hexagonal perforation 215 occupies an area of 0.0314 in$^2$. The hexagonal perforations 215 are arranged in vertical columns. The odd number columns are shifted down (as viewed in FIG. 24) at a distance that is half of the distance between adjacent perforations 215 in a column. In this arrangement, the total open air flow area is 11.76 in$^2$, the obstructed area is 0.829 in$^2$, and the usable area is 10.93 in$^2$. Thus, the configuration of the hexagonal perforations 15 of FIG. 23 provides more air flow area than the configuration of the circular perforations 115 of FIG. 22, as well as more than the configuration of the hexagonal perforations 215 of FIG. 24.

However, in alternative embodiments other forms of screens with perforations therethrough may be used. For example, an alternative screen may include a wire mesh, a set of spaced apart parallel bars, or any other configuration of a perforated structure that is operative to permit airflow through the structure, while preventing the passing of unwanted objects (e.g. large bugs, road debris, etc.).

Figure 2:
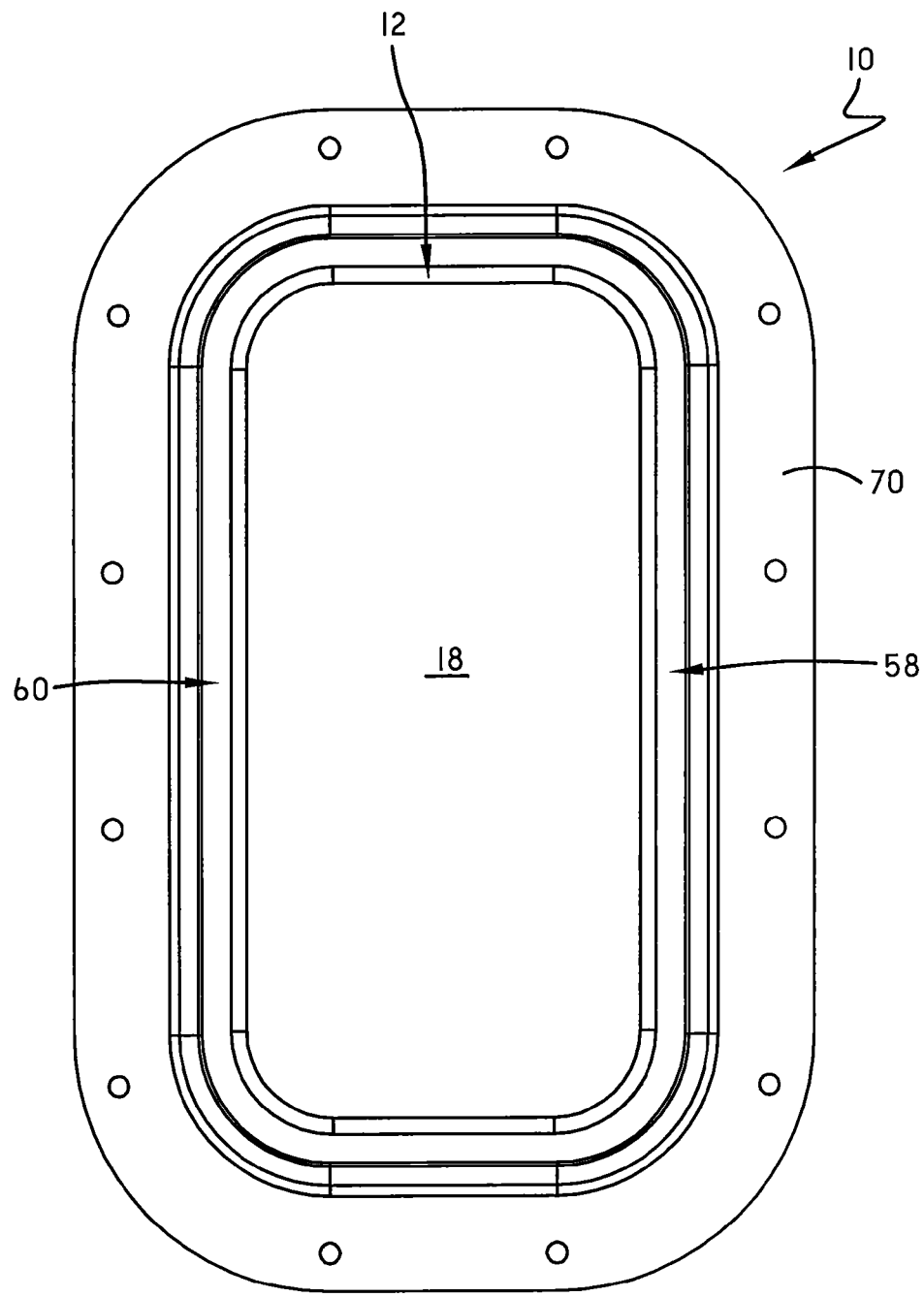
FIG. 2 is a front view showing a door of the vent.

FIG. 2 illustrates a front side view of the vent. Here the vent may include a door 18 adjacent the exterior face of the screen. FIG. 2 shows the door in a closed position in which the door is located in contact with the screen (or a frame 70 around the screen) and covers the perforations through the screen.

Figure 3:
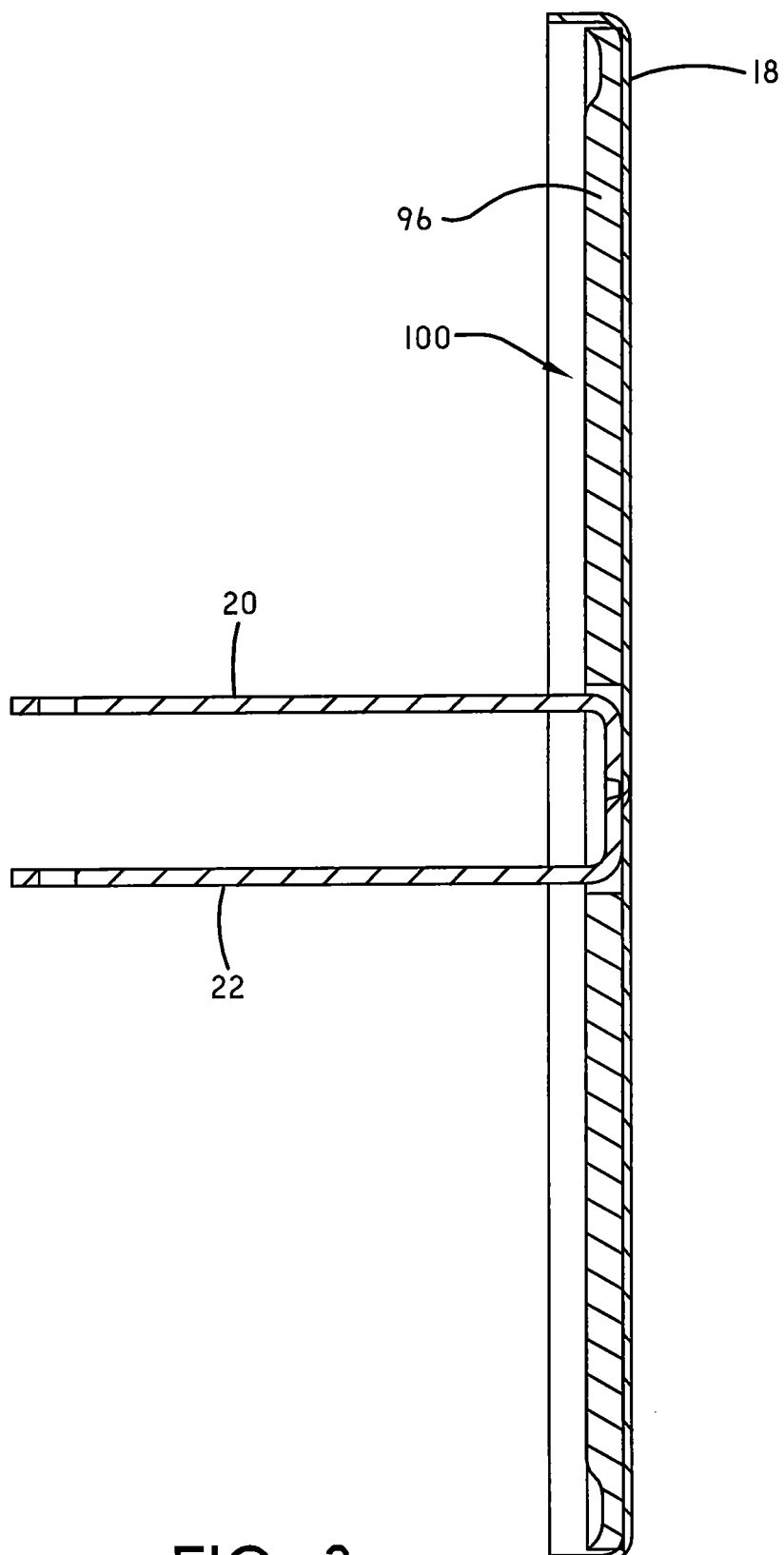
FIG. 3 is a cross-sectional view of the door.

As illustrated in FIG. 3 (showing the door 18 apart from the vent), the door 18 may include a seal 96 such as a foam sheet (or other compressible material) that is adhesively mounted to an inside surface of the door. When the door is in the closed position (as shown in FIG. 2), the door may compress the seal 96 against the exterior face of the screen in order to prevent (or at least substantially prevent) the inflow of air or water through the screen, and/or to reduce the transmission of road noises, and other sounds through the vent.

In addition, as shown in FIG. 3, the door 18 may include two or more spaced apart arms 20, 22 that extend from the door 18. Referring back to FIG. 1, the two spaced apart arms 20, 22 extend through at least one slot 16 in the screen. For example, the screen may include separate slots 16 (e.g., two) as shown in FIG. 1 which respectively receive the two arms of the door. However, in an alternative embodiment, rather than having two spaced apart slots 16 to receive the two arms of the door, the screen may include one relatively wider slot that is sized to receive both arms of the door therethrough.

As illustrated in FIG. 1, an example embodiment of the vent 10 may include a handle 26 that is in pivoting connection with the two spaced apart arms 20, 22. In addition, an example embodiment of the vent 10 may include a guide 24 mounted adjacent the interior face of the screen such that at least a portion of the guide is positioned between the spaced apart arms 20, 22 of the door that extend through the at least one slot 16 in the screen.

Figure 4:
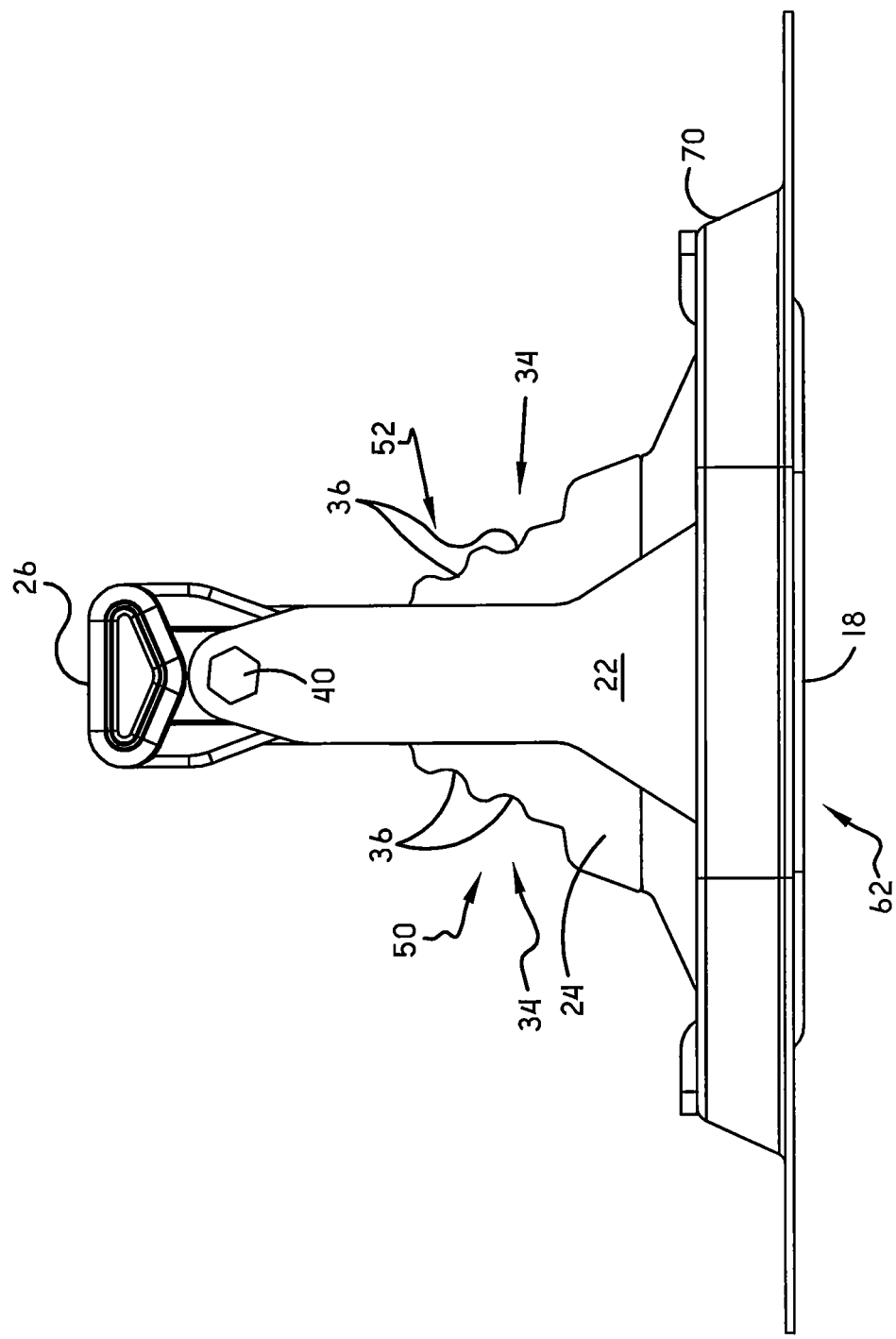
FIG. 4 is a bottom view of the vent with the door closed.
Figure 5:
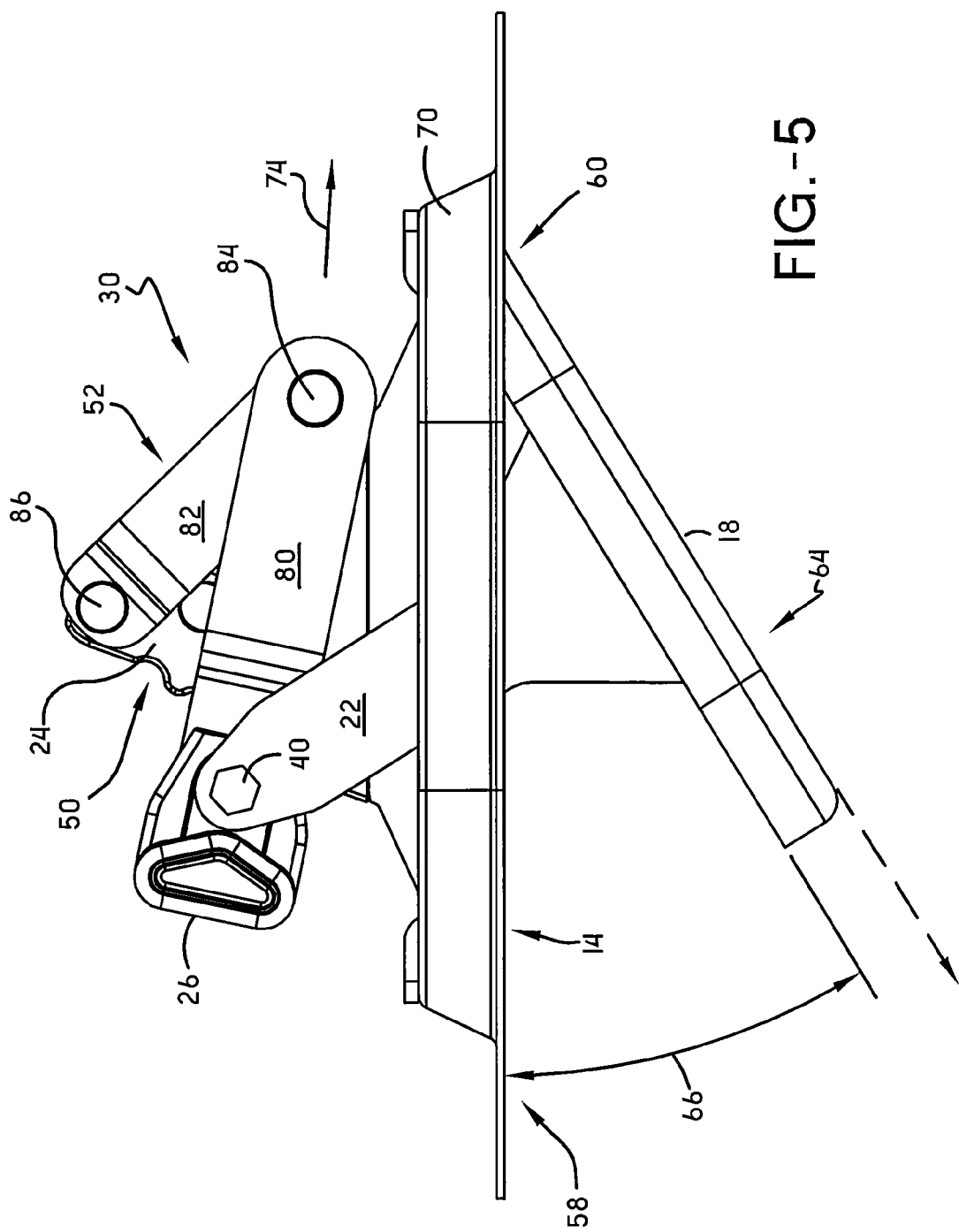
FIG. 5 is a bottom view of the vent with the door open in a first direction.
Figure 6:
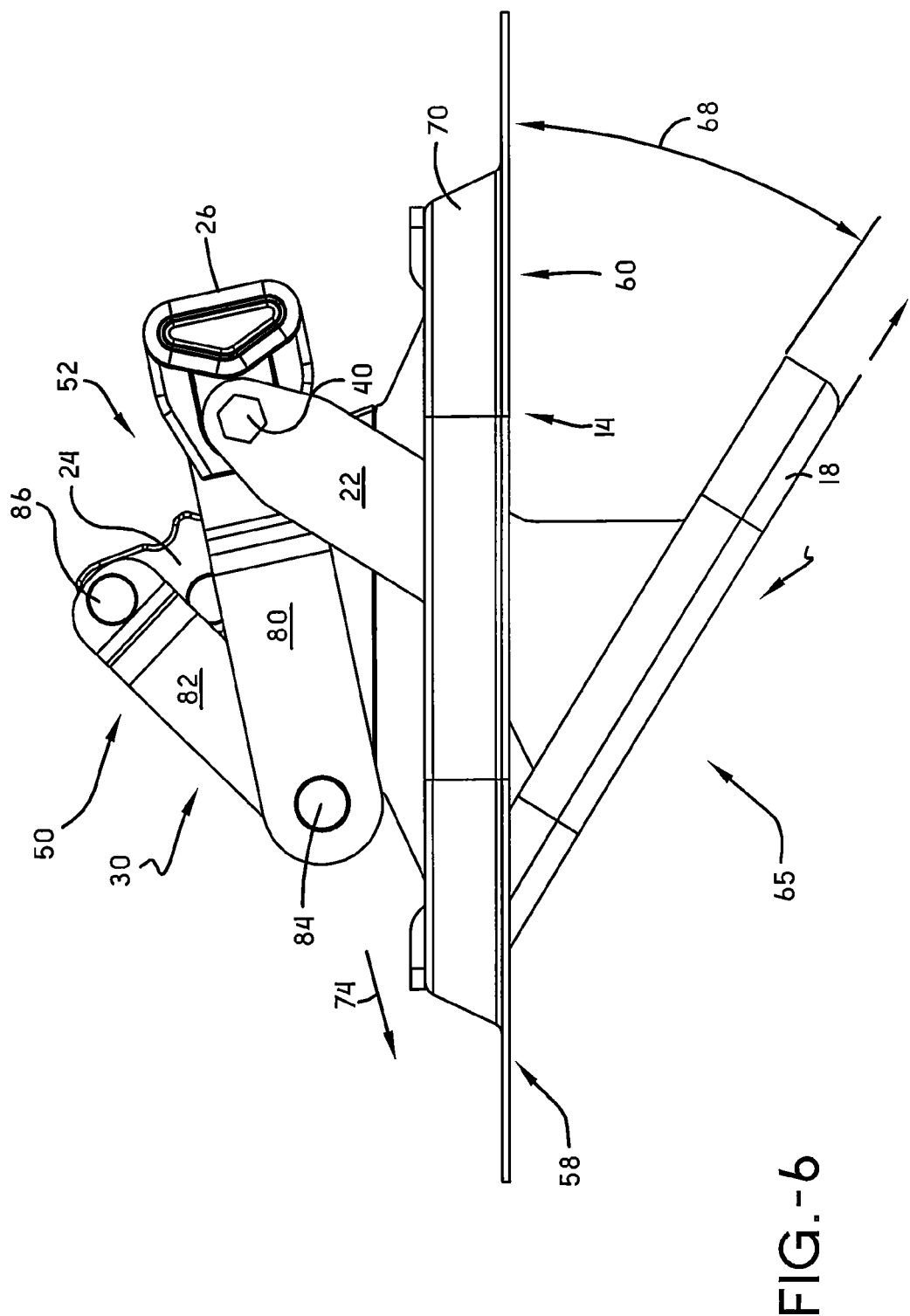
FIG. 6 is a bottom view of the vent with the door open in a second direction.

As illustrated in the bottom views of the vent in FIGS. 4-6, the handle 26 is operative to move relative to the guide 24 to cause the door 18 to move between a closed position 62

(shown in FIG. 4) adjacent the screen to one of a plurality of open positions 64, 65 (shown in FIGS. 5 and 6) extending at an acute angle with respect to the screen. In example embodiments, the guide 24 has a configuration such that the door 18 will open in different directions (as depicted in FIGS. 5 and 6) depending on which side of the guide the handle is moved.

Figure 7:
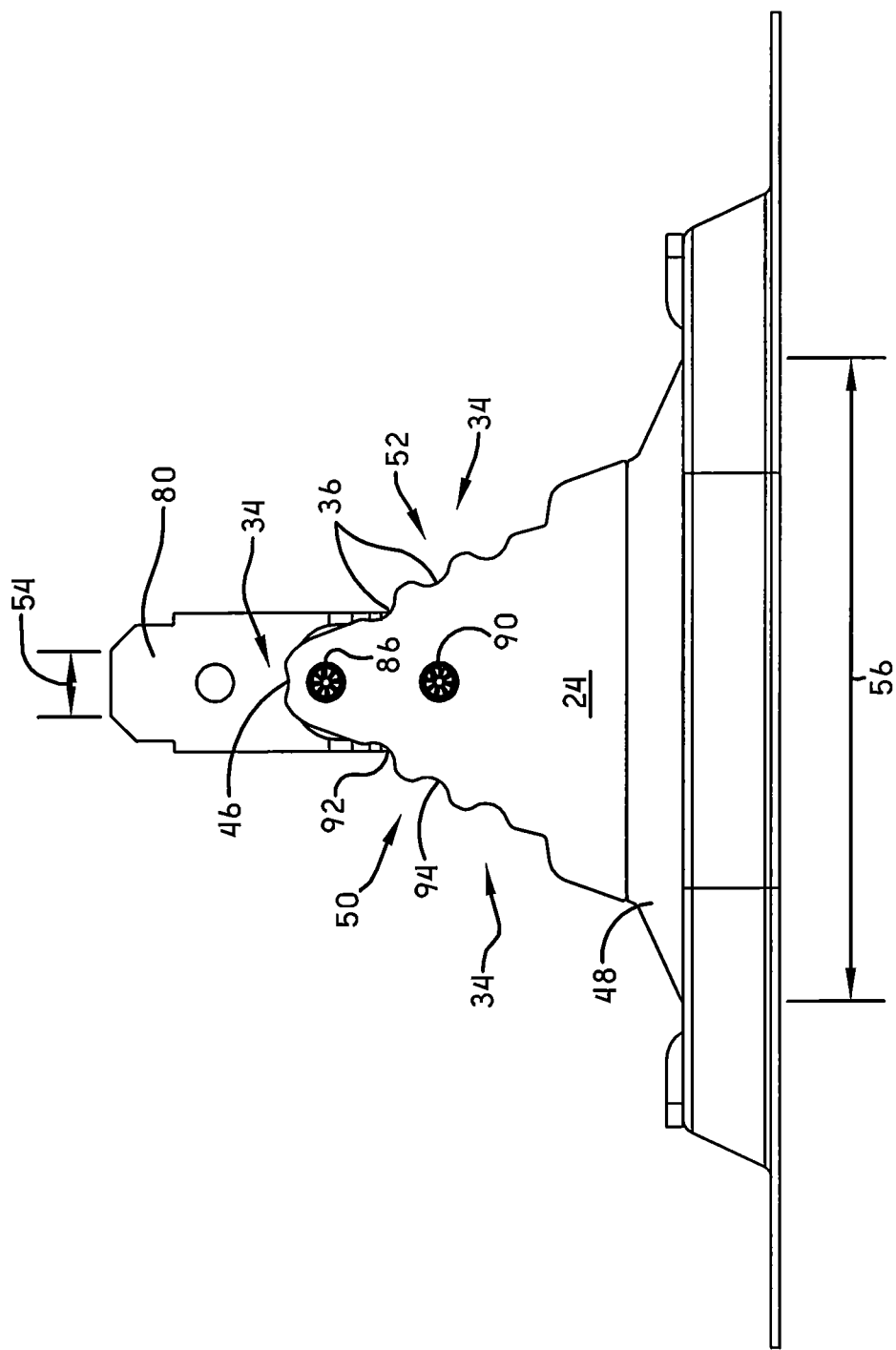
FIG. 7 is a side view showing features of a guide of the vent.

FIG. 7 illustrates an example configuration for the guide 24. Here the guide 24 may include generally centrally located apex 46. Also, the guide 24 may include a base 48 adjacent the screen of the vent. In addition, the guide may include two opposed first and second sides 50, 52 that extend from the apex to the base. In this example embodiment of the guide, the apex has a length 54 that is narrower than a length 56 of the base. As a result, the overall appearance of the guide may resemble a triangular shape.

Figure 8:
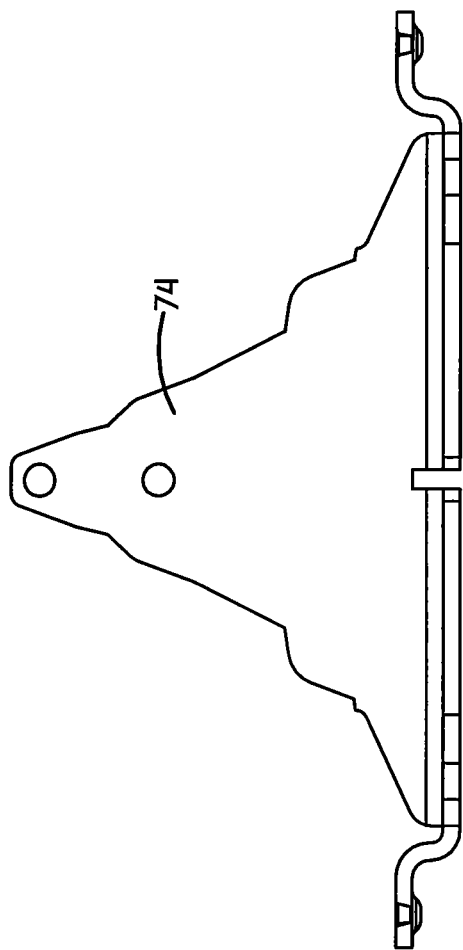
FIG. 8 is a side view showing features of a support bracket of the guide.
Figure 9:
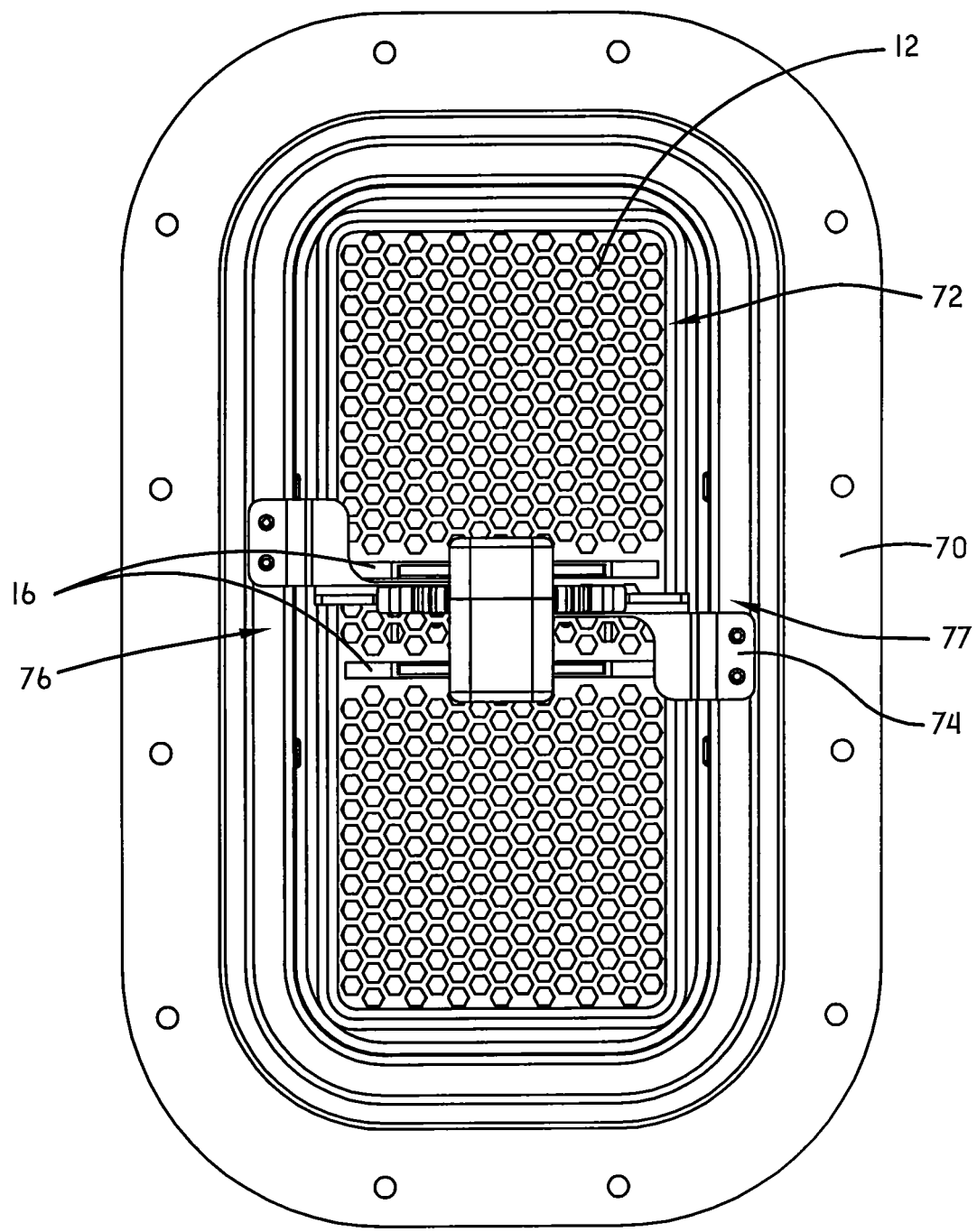
FIG. 9 is a back view showing a handle of the vent.

In order to mount the guide to the vent adjacent the screen (as illustrated in FIG. 8), the guide may include a support bracket 74. The support bracket may have a sufficient length that it is operative to be mounted to portions of the vent on either side of the screen. For example, as shown in FIG. 9, the vent may include a frame 70 with an interior area 72 that includes the screen 12. Here the support bracket 74 of the guide is mounted to opposite sides of 76, 77 of the frame in a location that extends over and between the slots 16 in the screen.

Figure 10:
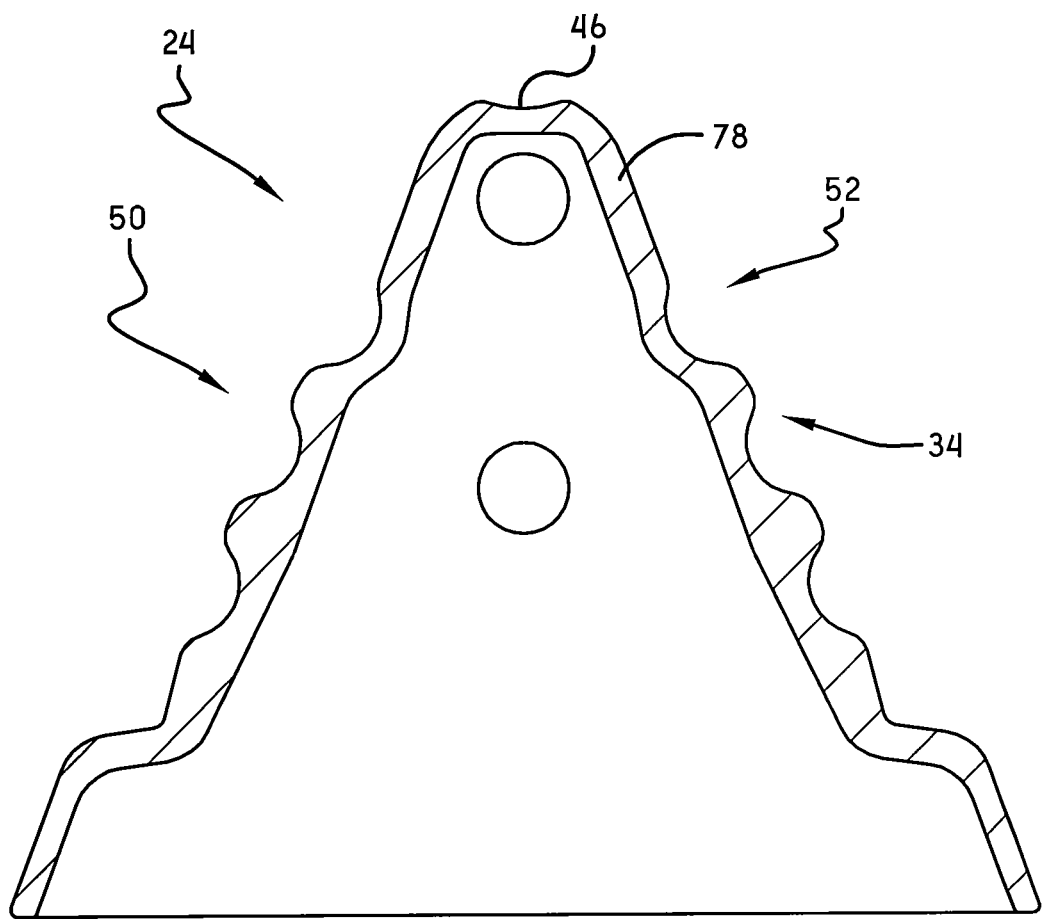
FIG. 10 is a cross-sectional view showing features of a detent cover of the guide.

As illustrated in FIG. 10, the example guide may include a detent cover 78 that is mounted so as to extend in surrounding relation of portions of the support bracket 74 (shown in FIG. 8). Such a detent cover 78 may correspond to a plastic sleeve that slides over top of the support bracket to provide a guide with an outer guide surface 34 with a configuration that includes the apex and sides of the guide described previously. For example, as shown in FIG. 7, the guide surface provided by the detent cover may include a plurality of spaced apart recesses (i.e., detents) 36 on each of the sides 50, 52 of the guide. The detent cover may also provide a detent on the apex 46 of the guide.

Figure 19:
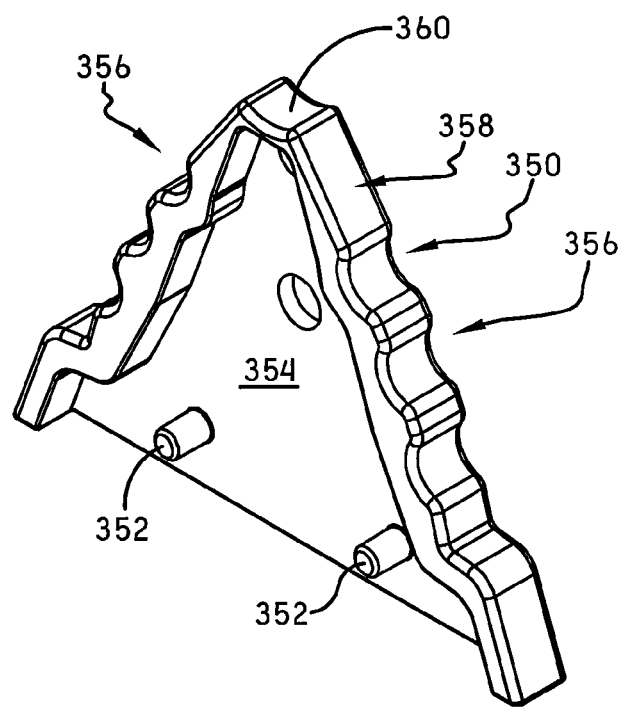
FIG. 19 is a perspective view showing features of an alternative configuration of a detent cover of the guide.

Although in this example embodiment, the guide is shown as being described as being formed from a support bracket 74 and a detent cover 78, it is to be understood that in alternative embodiments the guide may be comprised of a single part (e.g. a metal support bracket with an outer surface that corresponds to the described guide surface of the detent cover). Also in alternative embodiments, rather than having a detent cover in the form of a sleeve that slides over and encases portions of the support bracket, the detent may have other configurations that mount to the support bracket. For example, as illustrated in FIG. 19, a detent cover 350 may be configured as a side mounted component with a single side wall 354 that includes projections 352. In this embodiment, the guide may be assembled by snapping the detent cover adjacent a side of the support bracket, such that the projections 352 extend through corresponding apertures (not shown) in the support bracket to hold the guide together.

Figure 20:
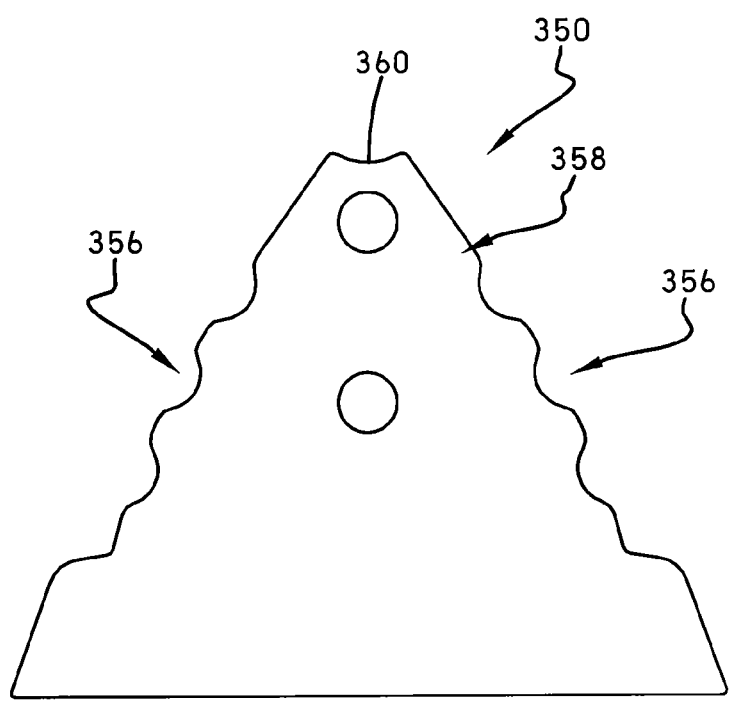
FIG. 20 is a side view showing features of the alternative detent cover of the guide.
Figure 2I:
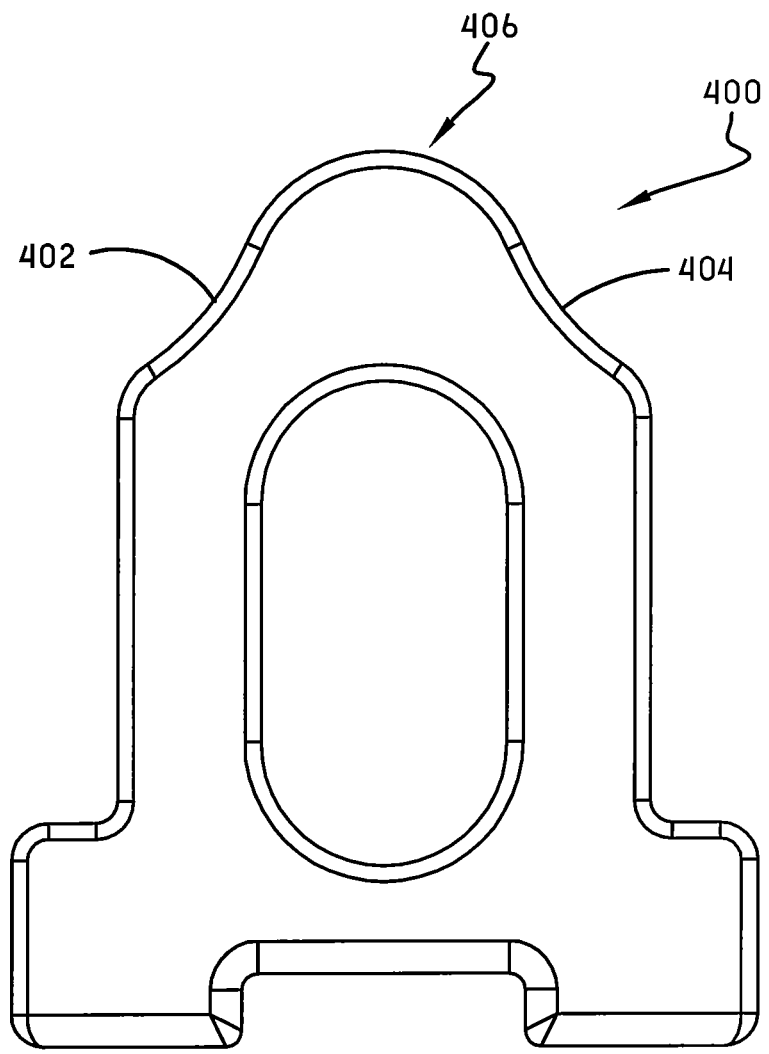

FIG. 20 shows a side view of the alternative embodiment of the detent cover 350 shown in FIG. 19. FIG. 20 also illustrates an alternative configuration for the guide surface 356 provided by the detent cover 350. Here the guide surface includes a relatively wider upper portion 358 of the guide surface below the apex 360, compared to the narrower upper portion of the guide surface below the apex 46 of the detent cover 78 shown in FIG. 10.

In addition, although the support bracket 74 of the guide is described as being mounted to a frame that surrounds the screen, it is to be understood that alternative embodiments may have other configurations. For example, the support bracket may be mounted directly to portions of the screen intermittent of the two slots 16 through the sleeve. In addition, although the vent has been described as having a frame surrounding the screen, it is to be understood that the frame and screen may correspond to one common piece of metal (such as steel) that has been stamped to include the frame portion surrounding an interior perforated screen portion. Furthermore, in alternative embodiments the frame and screen may be separate components and/or may be made of separate materials which are mounted together using suitable fasteners (e.g., via welding, screws, rivets, or any other mechanism suitable to fasten such parts together).

The door 18 also may include a peripheral flange 500 (FIG. 25) that extends toward the screen and surrounds the seal 96. The frame 70 may include a raised rib 501 (FIG. 25) that surrounds the perforations 15. When the door 18 moves between the closed position and one of the open positions, it pivots about one of the opposite raised side ends 502, 503 (FIG. 30) of the rib 501 at the flange 500. During this movement, the flange 500 rubs against the side end of the frame 70 and causes wear on both the frame 70 and the flange 500. To reduce this wear, wear-resistant pads or bumpers 504 (FIG. 25) are provided on the rib 501 to prevent or minimize contact between the frame 70 and flange 500. In particular, each bumper 504 includes a generally L-shaped base 506 (FIGS. 25, and 27-29) and a bayonet fastener or barb 508 (FIGS. 26, 28, 29) extending from the base 506. The bumpers 504 are shown in FIGS. 25-35, which depict another exemplary embodiment of a vent apparatus 600 with an alternative handle assembly 626. However, it should be noted that the bumpers 504 may also be included in the exemplary embodiments of FIGS. 1-19, 36, and 37.

Figure 25:
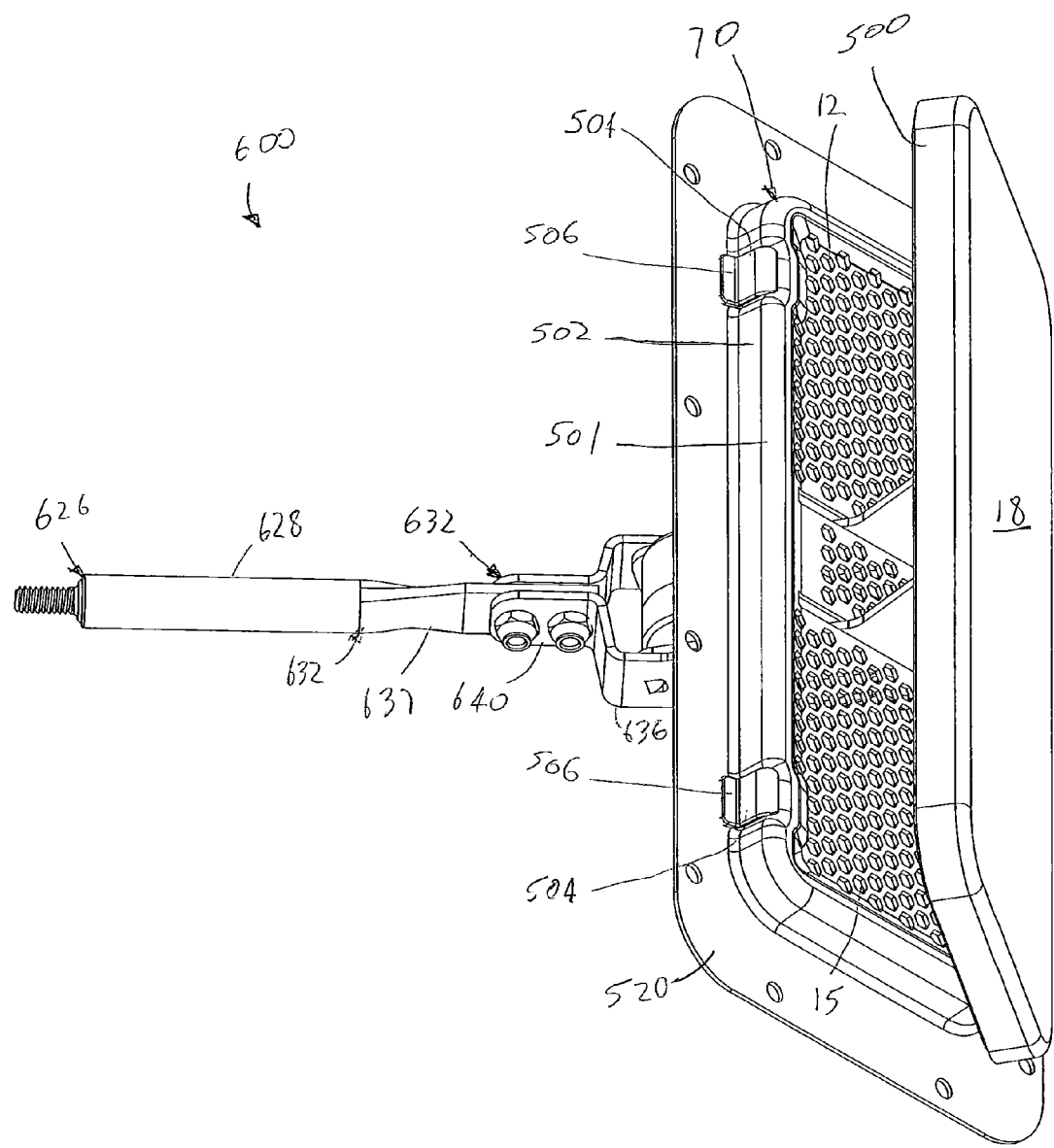
FIG. 25 is a front and left side perspective view of another exemplary embodiment of a vent.
Figure 29:
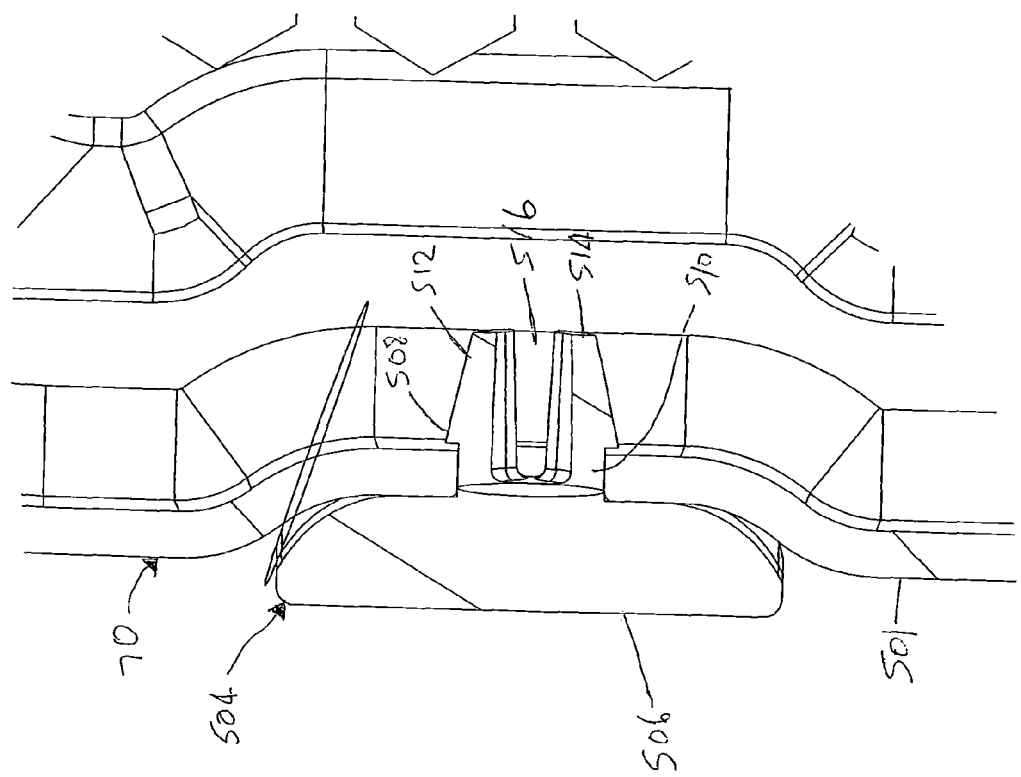
FIG. 29 is a partial section view taken along line 29-29 of FIG. 29.

Referring to FIG. 29, the fastener 508 includes a shaft portion 510 and a head 512. The head 512 is frustoconically shaped, and tapers toward its distal end 514. The fastener 508 is separated into two longitudinal half portions by a slit 516 so that the space between the half portions allows them to flex toward each other. When the bumper 504 is being mounted to the screen frame 70, the fastener 508 extends into an opening 518 (FIG. 28) of the frame 70 that is sized to cause the halves to flex toward each other to permit the head 512 to extend through the opening 518. After the head 512 extends through the opening 518, the halves flex back away from each other to prevent withdrawal of head 512. As seen in FIG. 28, when the bumper 504 is mounted to the screen frame 70, the base 506 fits the contour of the associated side end 502 and a peripheral flange 520 of the frame 70 that surrounds the rib 501 and extends outwardly therefrom. In particular, the base 506 includes a first leg portion 522 that abuts the side end 502 of the rib 501 and curves slightly toward the screen 12 at free end 523 of the first leg portion 522. The base 506 further includes a second leg portion 524 that abuts the peripheral flange 520. As seen in FIGS. 25 and 28, the side end 502 of the rib 501 may be slightly recessed at the area engaging the base 506 to provide additional support to the bumper 504. Alternatively, the bumper 504 may be mounted on the door 18.

Figure 30:
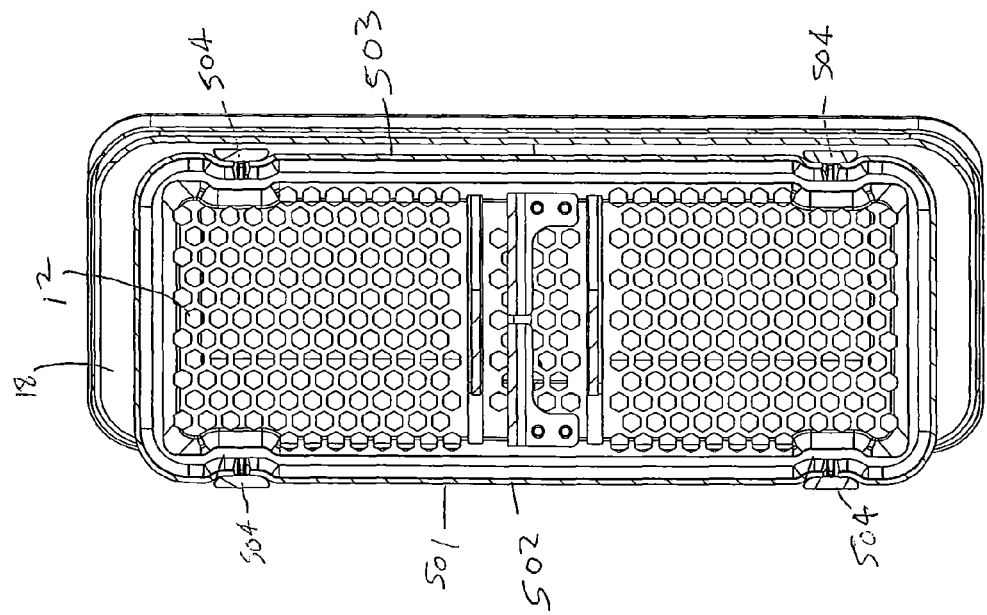
FIG. 30 is a sectional view similar to that of FIG. 29 but not enlarged, to show the entire vent in that view.
Figure 31:
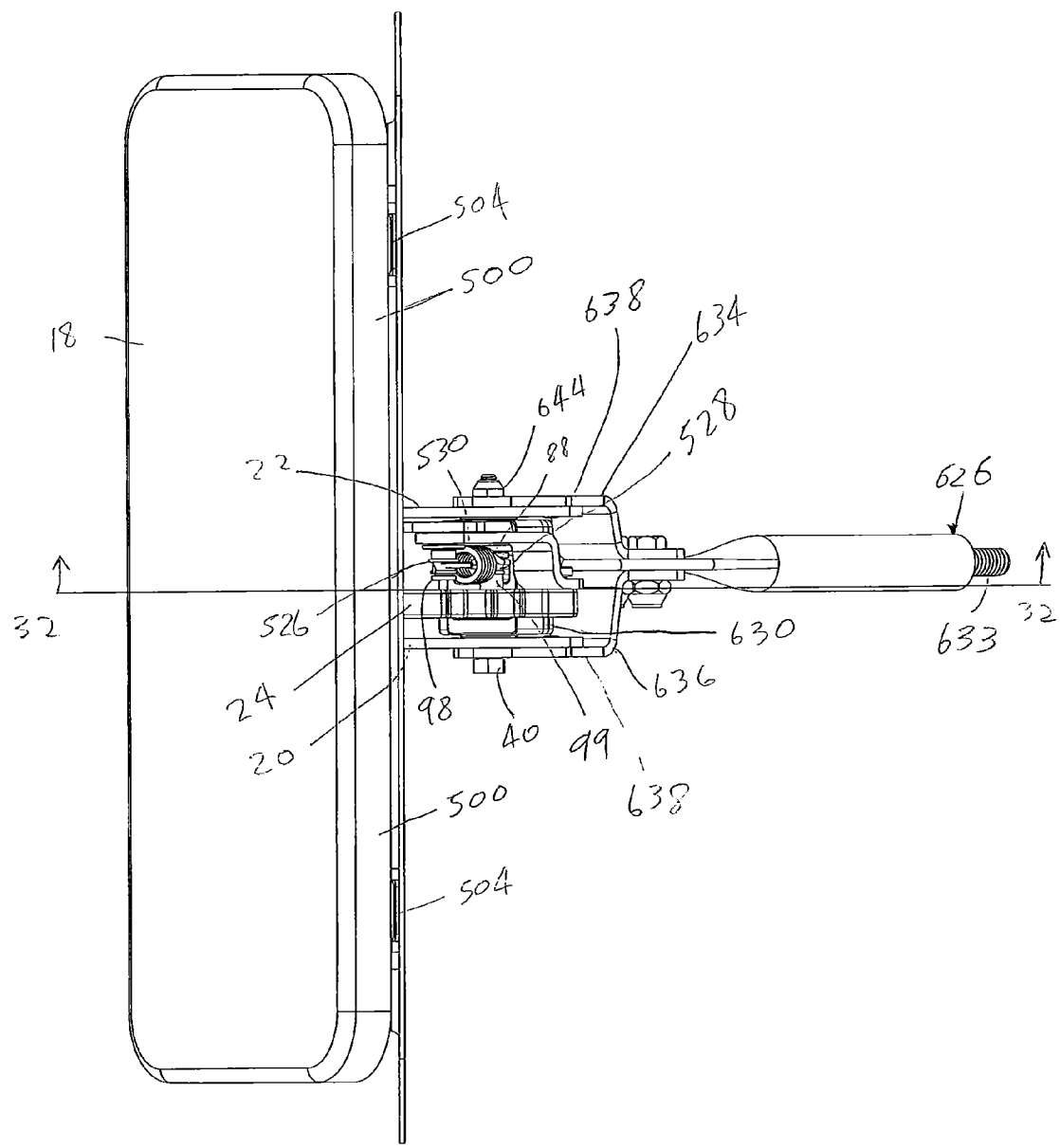
FIG. 31 is a right side perspective view of the vent of FIG. 25.
Figure 32:
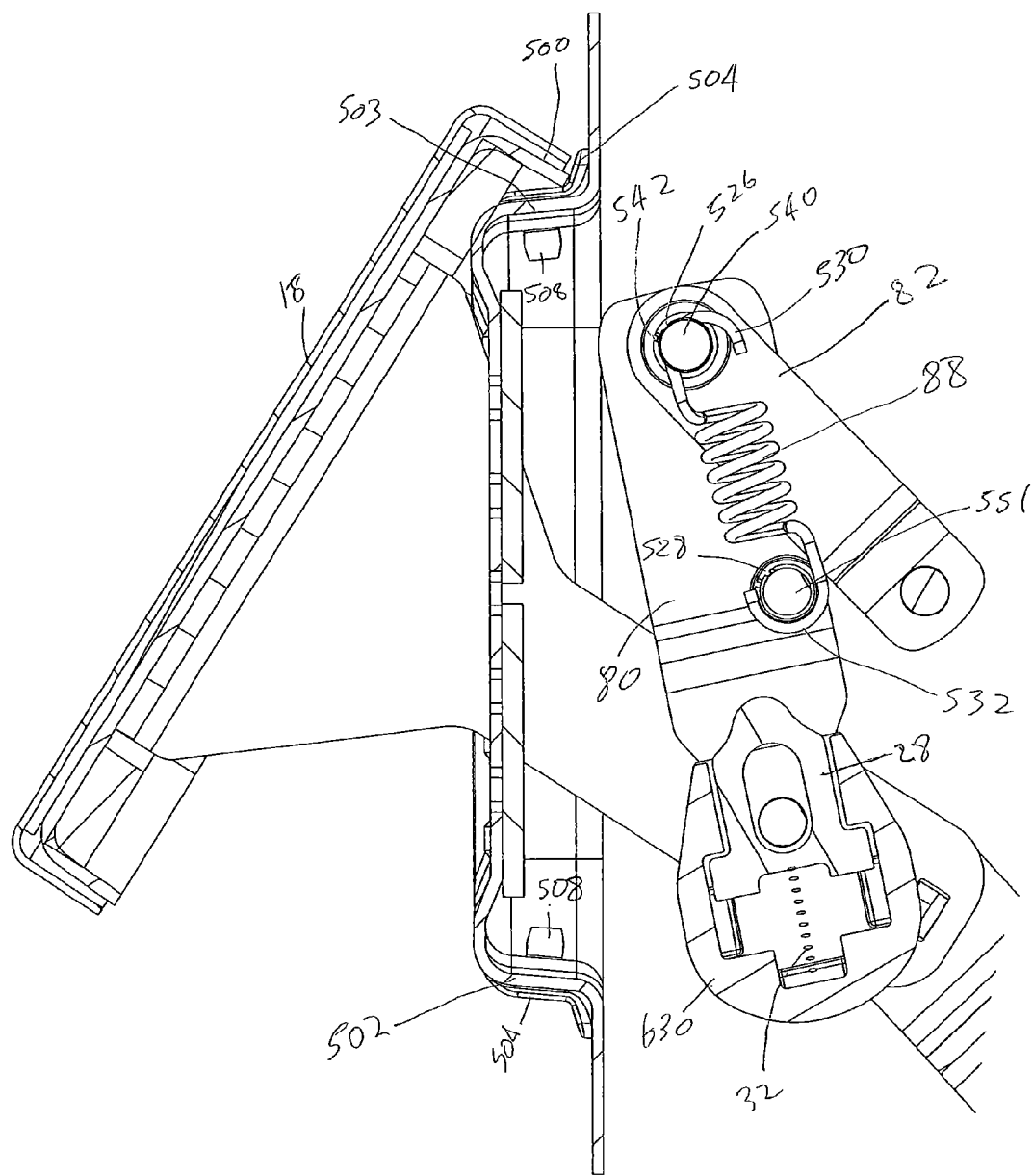
FIG. 32 is a partial sectional view taken along line 32-32 of FIG. 31.

The bumper 504 may be comprised of a durable low friction material. For example, the material may comprise nylon with a 15 percent glass fiber reinforcement that is able to withstand a temperature of 450 degrees Fahrenheit for one minute. The bumper 504 may be made of other suitable durable low friction material such as those that comprise plastic or metal. For example, the bumper 806 may be made of a ceramic material or a polyoxymethylene material such as Delrin®. As seen in FIG. 30, a pair of bumpers 504 are located on each of the opposite side ends 502, 503 of the rib 501. At this location, each bumper 504 at the corresponding side end contacts the flange 500, as illustrated in FIGS. 31 and 32, during the opening and closing of the door 18 instead of the screen frame 70 contacting the flange 500. Since the bumpers 504 are made of a low friction material, the wear on the flange 500 is significantly reduced.

In another exemplary arrangement, a bumper assembly 804 may be used instead of the previously mentioned bumper 504. Referring to FIG. 40, this bumper assembly 804 includes a bumper 806, a foam gasket seal 808, and a semi-tubular rivet 810. The bumper 806 includes a generally L-shaped base 811. As seen in FIGS. 39 and 42, when the bumper 806 is mounted to the screen frame 70, the base 811 fits the contour of the associated side end 502 and a peripheral flange 520 of the frame 70 that surrounds the rib 501 and extends outwardly therefrom. In particular, the base 811 includes a first leg portion 822 that fits over the side end 502 of the rib 501, and a second leg portion 824 that abuts the peripheral flange 520. Referring to FIG. 40, the bumper 806 includes a mounting aperture 812 that securely receives a shaft 814 of the rivet 810. The gasket seal 808 is square shaped and includes an aperture 816. The gasket seal 808 may be made of plastic foam or other suitable sealing material. The rivet 810 includes a head 818 and the shaft 814.

The bumper assembly 804 is mounted to the screen frame 70 as follows. The foam gasket seal 808 is first attached to the back side 820 of the first leg 822 of the bumper 806 using an adhesive or other suitable way to attach it thereto with the apertures 812, 816 aligned to each other. The rivet 810 is inserted through opening 518 (FIG. 28) in the frame 70 from the interior side of the vent 10 such that the head 818 of the rivet 810 is adjacent the inner portion 826 of the side end 502 of the rib 501 as seen in FIG. 41. The bumper 806 with the attached seal 808 is then slid via the apertures 812, 816 around the shaft 814 of the rivet 810. The rivet 810 and bumper 806 with seal 808 are then secured to each other by a suitable device that expands the diameter of the shaft 814 of the rivet 810.

When the rivet 810 and bumper 806 with seal 808 are secured to each other, the foam gasket seal 808 abuts against the outer portion 828 of the side end 502 and the second leg portion 824 abuts against the peripheral flange 520 as seen in FIGS. 39 and 42. The rivet 810 provides a stronger connection of the bumper 806 than the bumper 504 with the integral fastener 508 so that the door 18 will better be able to catch the bumper 806 and not deflect off of the bumper 806 during closing of the door 18. Also, this stronger connection helps prevent the bumper 806 from breaking away or disassembling from the screen frame. The seal 808 prevents water or other liquid from the outside from leaking through the opening 518 and into the interior area of the vent 10. In an alternative arrangement, the rivet 810 may be inserted through the opening 518 from the outer side of the vent 10 such that the head 818 of the rivet 810 is positioned adjacent the bumper 806. Also, the seal 808 may also be included in the exemplary embodiment comprising the bumper 504. In particular, the seal 808 may be constructed to receive the fastener 508 and be positioned between the base 506 of the bumper 504 and side end 502.

The bumper 806 may be comprised of a durable low friction material. For example, the material may comprise nylon with a 15 percent glass fiber reinforcement that is able to withstand a temperature of 450 degrees Fahrenheit for one minute. The bumper 806 may be made of other suitable durable low friction material such as those that comprise plastic or metal. For example, the bumper 806 may be made of a ceramic material or a polyoxymethylene material such as Delrin®. As seen in FIG. 41, a pair of bumper assemblies 804 are located on each of the opposite side ends 502, 503 of the rib 501. At this location, each bumper 806 at the corresponding side end contacts the flange 500 during the opening and closing of the door 18 instead of the screen frame 70 contacting the flange 500. Since the bumpers 806 are made of a low friction material, the wear on the flange 500 is significantly reduced. In all other aspects, the exemplary embodiment of this vent is similar in structure and function to that of the previously mention embodiments of the vent. The bumper assemblies 804 depicted in FIGS. 39-42 may be may be included in FIGS. 25-38 instead of the previously mentioned bumper 504. The bumper assemblies 804 may also be included in the exemplary embodiments of FIGS. 1-19.

Figure 53:
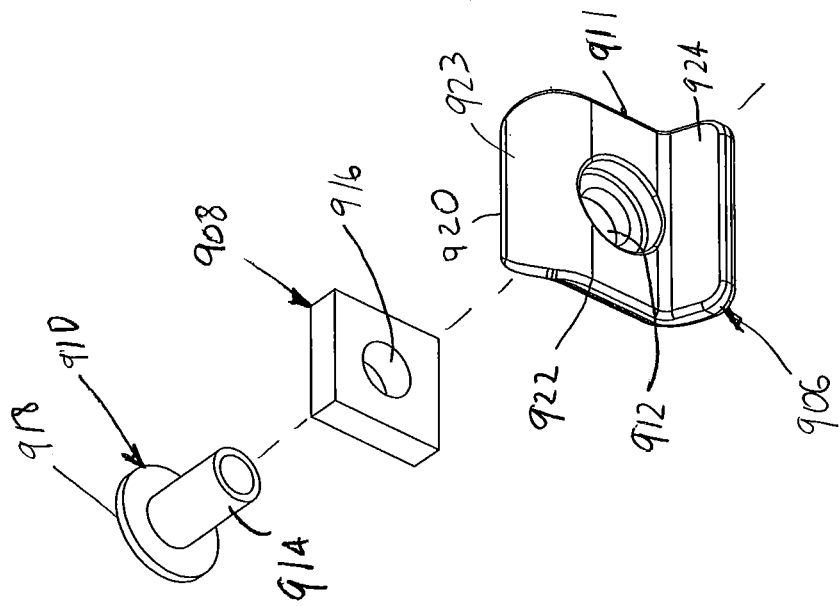
FIG. 53 is an exploded view of the bumper assembly of the exemplary embodiment of FIG. 52.
Figure 52:
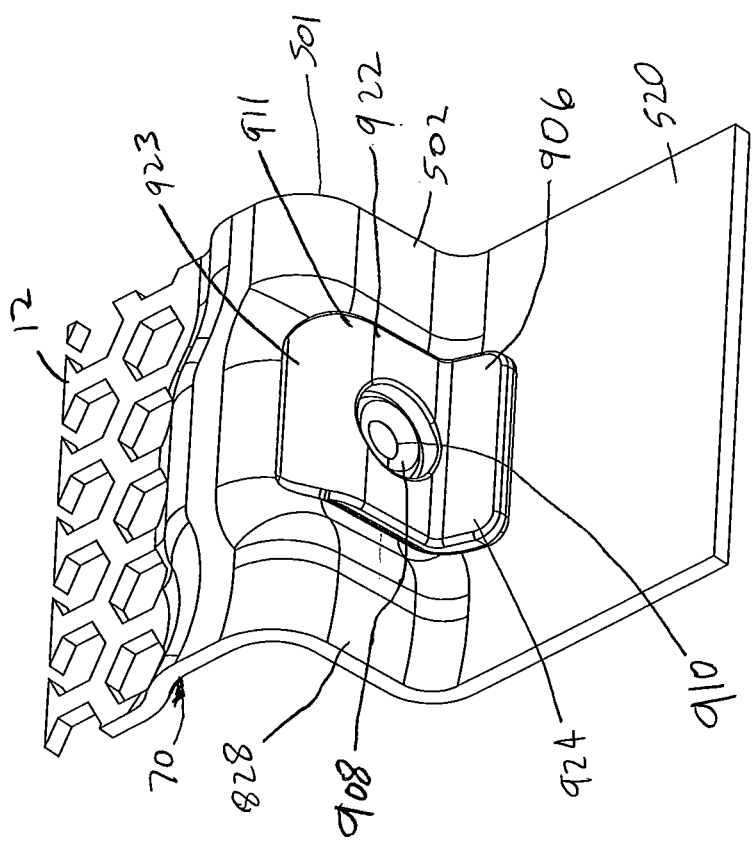
FIG. 52 is a front perspective view of a portion of the screen showing a bumper assembly of still another exemplary embodiment.

FIGS. 52 and 53 show another exemplary arrangement of a bumper assembly 904. Referring to FIG. 53, this bumper assembly 904 includes a bumper 906, a foam gasket seal 908, and a semi-tubular rivet 910. The bumper 906 includes a generally L-shaped base 911. As seen in FIG. 52, when the bumper 906 is mounted to the screen frame 70, the base 911 fits the contour of the associated side end 502 and a peripheral flange 520 of the frame 70 that surrounds the rib 501 and extends outwardly therefrom. In particular, the base 911 includes a first leg portion 922 that fits over the side end 502 of the rib 501 and curves slightly toward the screen 12 at free end 923 of the first leg portion 922. The base 911 also includes a second leg portion 924 that abuts the peripheral flange 520. Referring to FIG. 53, the bumper 906 includes a mounting aperture 912 that securely receives a shaft 914 of the rivet 910. The gasket seal 908 is square shaped and includes an aperture 916. The gasket seal 908 may be made of plastic foam or other suitable sealing material. The rivet 910 includes a head 918 and the shaft 914.

The bumper assembly 904 is mounted to the screen frame 70 as follows. The foam gasket seal 908 is first attached to the back side 920 of the first leg 922 of the bumper 906 using an adhesive or other suitable way to attach it thereto with the apertures 912, 916 aligned to each other. The rivet 910 is inserted through opening 518 (FIG. 28) in the frame 70 from the interior side of the vent 10 such that the head 918 of the rivet 910 is adjacent the inner portion 826 of the side end 502 of the rib 501. The bumper 906 with the attached seal 908 is then slid via the apertures 912, 916 around the shaft 914 of the rivet 910. The rivet 910 and bumper 906 with seal 908 are then secured to each other by a suitable device that expands the diameter of the shaft 914 of the rivet 910.

When the rivet 910 and bumper 906 with seal 908 are secured to each other, the foam gasket seal 908 abuts against the outer portion 828 of the side end 502 and the second leg portion 924 abuts against the peripheral flange 520 as seen in FIG. 52. The rivet 910 provides a stronger connection of the bumper 906 than the bumper 504 with the integral fastener 508 so that the door 18 will better be able to catch the bumper 906 and not deflect off of the bumper 906 during closing of the door 18. Also, this stronger connection helps prevent the bumper 906 from breaking away or disassembling from the screen frame. The seal 908 prevents water or other liquid from the outside from leaking through the opening 518 and into the interior area of the vent 10. In an alternative arrangement, the rivet 910 may be inserted through the opening 518 from the outer side of the vent 10 such that the head 918 of the rivet 910 is positioned adjacent the bumper 906. Also, the seal 908 may also be included in the exemplary embodiment comprising the bumper 504. In particular, the seal 908 may be constructed to receive the fastener 508 and be positioned between the base 506 of the bumper 504 and side end 502.

The bumper 906 may be comprised of a durable low friction material. For example, the material may comprise nylon with a 15 percent glass fiber reinforcement that is able to withstand a temperature of 450 degrees Fahrenheit for one minute. The bumper 906 may be made of other suitable durable low friction material such as those that comprise plastic or metal. For example, the bumper 806 may be made of a ceramic material or a polyoxymethylene material such as Delrin®. Like the bumper assemblies 804 arranged in FIG. 41, a pair of bumper assemblies 904 are located on each of the opposite side ends 502, 503 of the rib 501. At this location, each bumper 906 at the corresponding side end contacts the flange 500 during the opening and closing of the door 18 instead of the screen frame 70 contacting the flange 500. Since the bumpers 906 are made of a low friction material, the wear on the flange 500 is significantly reduced. In all other aspects, the exemplary embodiment of this vent is similar in structure and function to that of the previously mention embodiments of the vent. The bumper assemblies 904 depicted in FIGS. 52 and 53 may be may be included in FIGS. 25-38 instead of the previously mentioned bumper 504. The bumper assemblies 904 may also be included in the exemplary embodiments of FIGS. 1-19.

Figure 11:
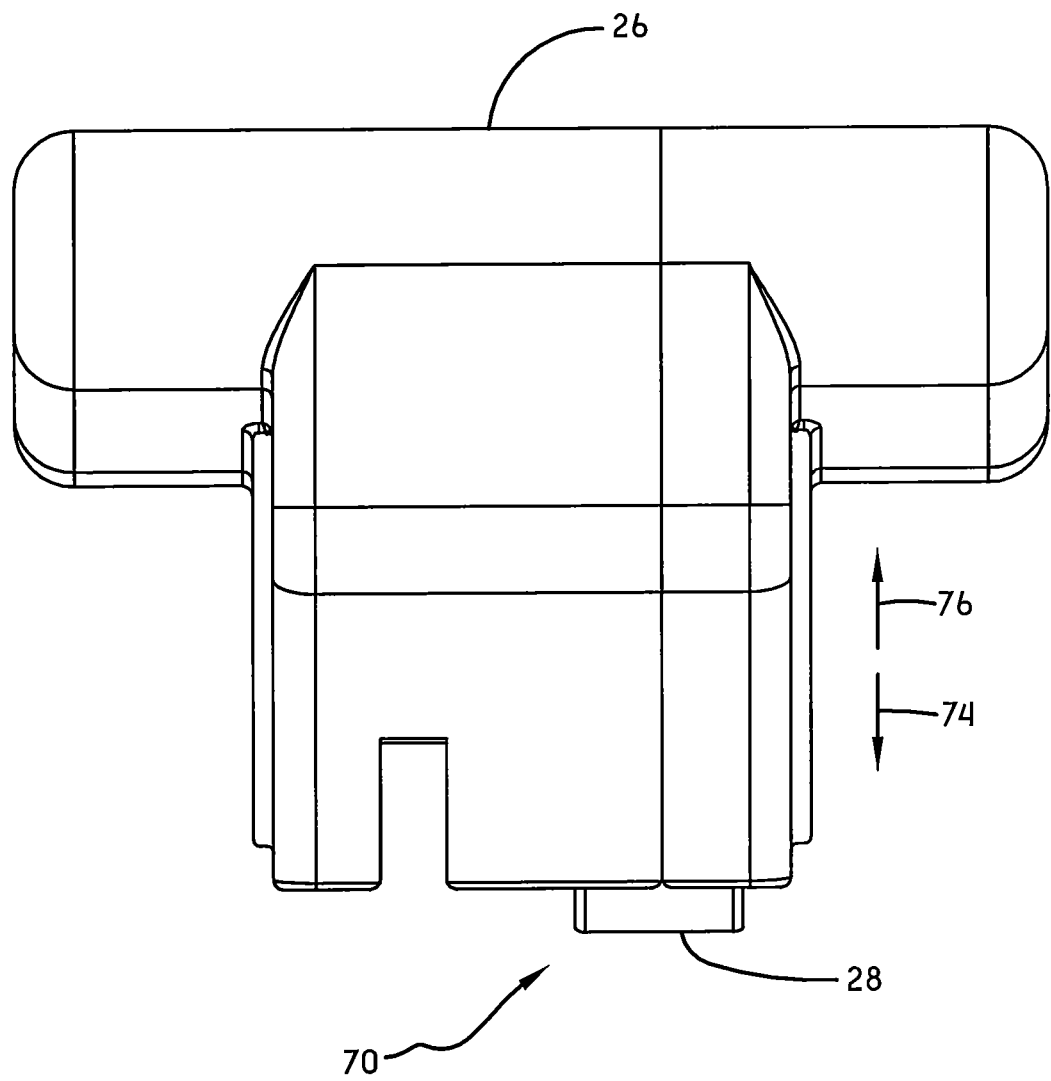
FIG. 11 is a side view of the handle with the bolt in a retracted position.
Figure 12:
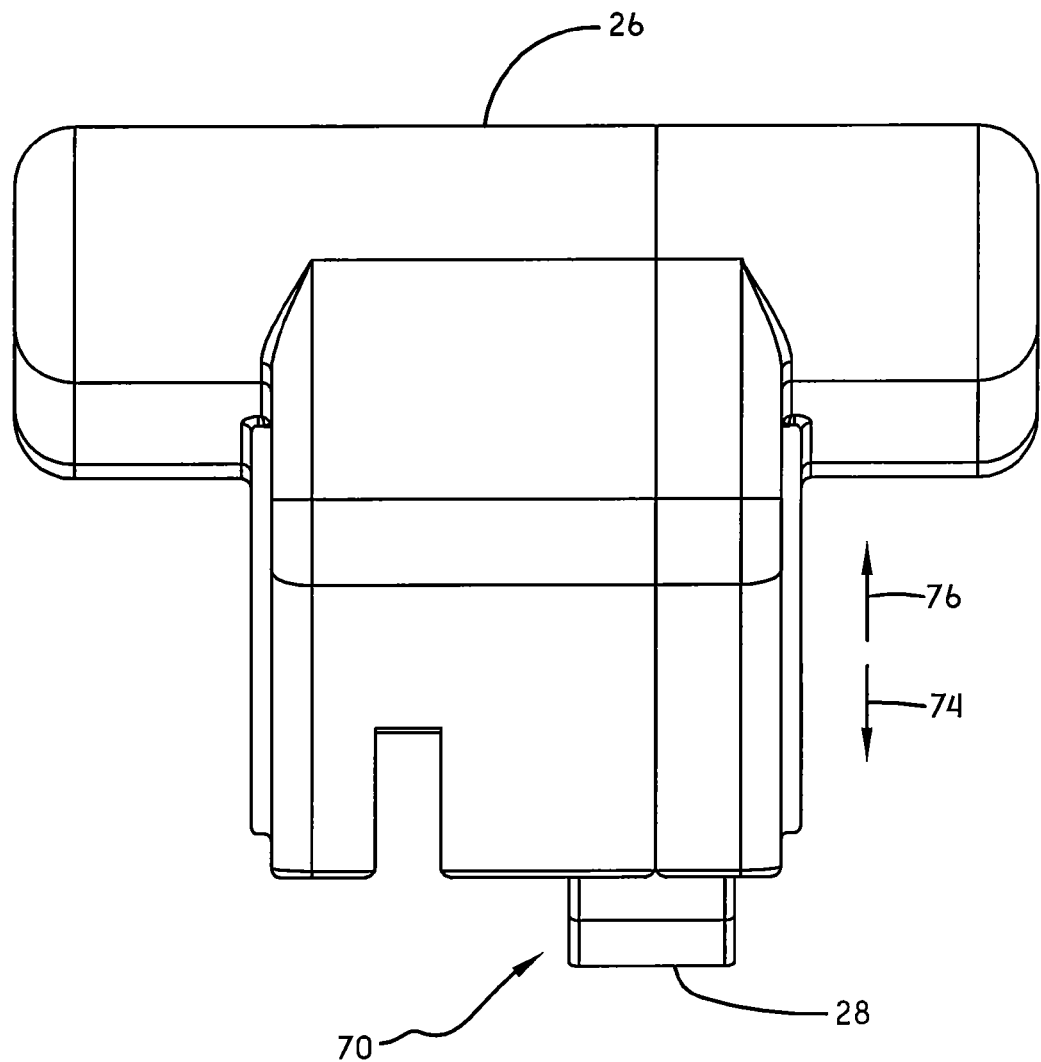
FIG. 12 is a side view of the handle with the bolt in an extended position.
Figure 13:
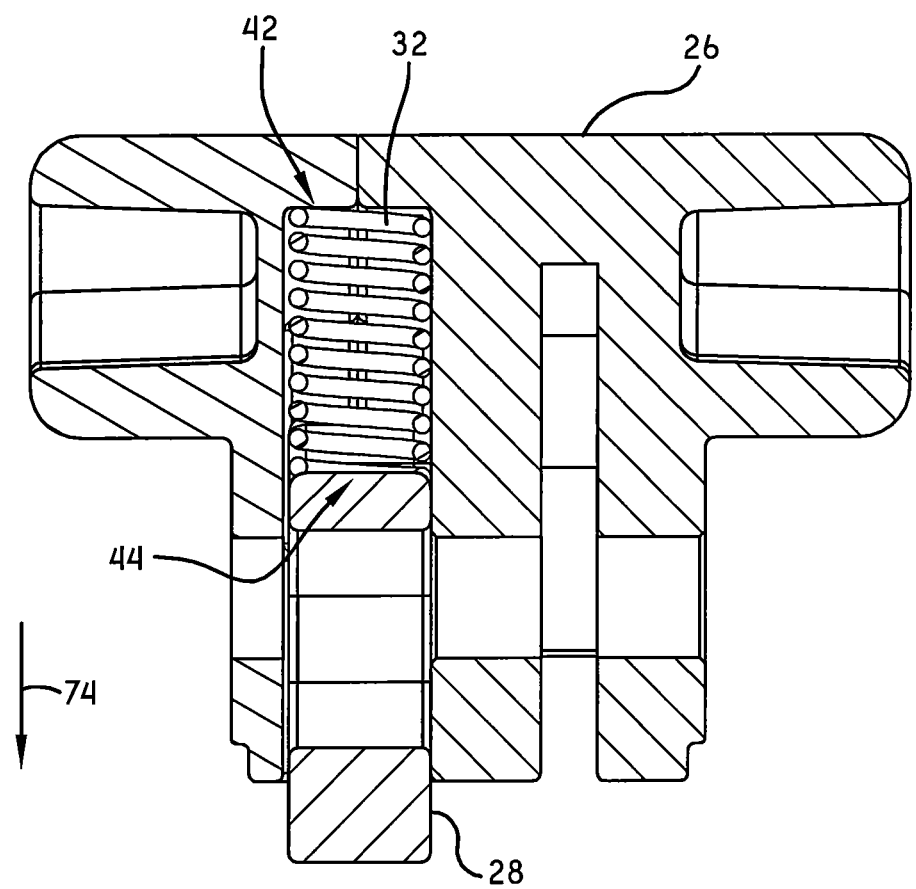
FIG. 13 is a cross-sectional view of the handle and bolt.

In example embodiments of the vent, the handle may include a movable portion that moves relative to the handle and is operative to extend into the previously described detents in the guide as the handle is moved along the guide. FIG. 11 illustrates an example embodiment of the handle 26, in which the movable portion corresponds to a movable bolt 28 that is operative to project from the handle. The bolt is operative to move relative to the handle in a first direction 74, from a retracted position 70 (shown in FIG. 11) to an extended position 72 (shown in FIG. 12). The bolt is also operative to move in an opposite second direction 76 from the extended position to the retracted position. FIG. 13 shows a cross-sectional view of the handle 26 and bolt 28. As shown in this view, the handle may include a biasing member 32 that is operative to urge the bolt to move in the first direction 74 relative to the handle. Such a biasing member may correspond to a coil spring positioned inside the handle between an interior wall 42 of the handle and a portion 44 of the bolt.

Figure 14:
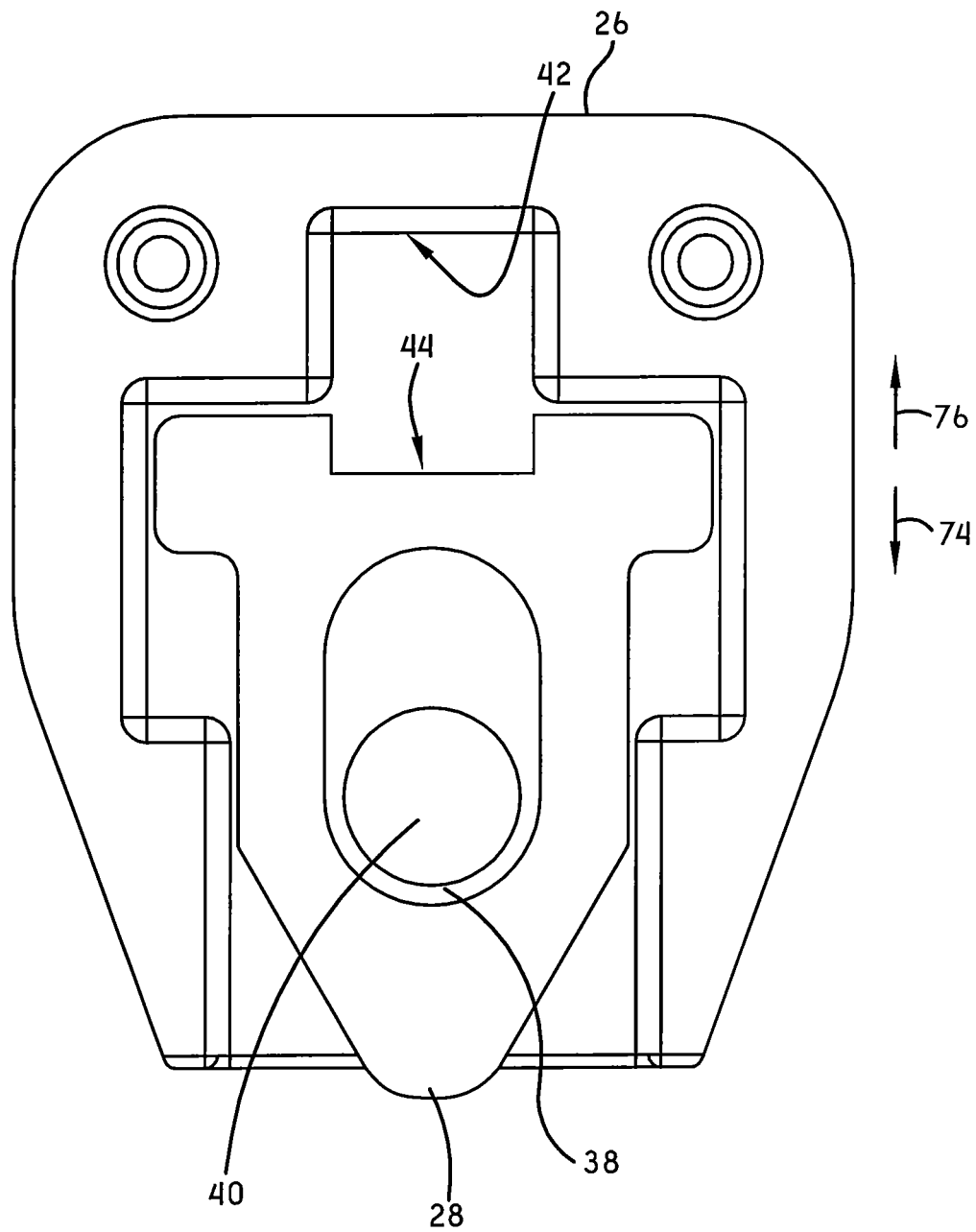
FIG. 14 is a further cross-sectional view of the handle and bolt.

FIG. 14 illustrates another cross-sectional view of the handle 26 (rotated 90 degrees compared to FIG. 13). As shown in this view, the bolt 28 may include an aperture 38 therethrough. This aperture of the bolt is elongated in the first and second directions to enable the bolt to move in the first and second directions relative a pin 40 that extends through the handle. Referring back to FIG. 1, this pin 40 extends through the arms 20, 22 of the door as well to place the handle in pivoting connection with the arms of the door. The elongated aperture in the bolt enables the bolt to slide relative to the handle and the pin 40.

In addition, it should be appreciated that embodiments of the bolt 28 may have alternative configurations which may vary for example depending on the desired configurations for the handle and the guide surfaces. For example, FIG. 21 illustrates an alternative configuration 400 for the bolt, in which the end of the bolt includes concaved sides 402, 404 and a relatively more blunted tip 406 compared to the bolt 28 shown in FIG. 14.

Referring back to FIG. 1, in example embodiments, the handle 26 may be in operative connection with a lever assembly 30 that extends from the handle to the guide and is in pivoting connection with the guide. In this example embodiment, as the handle moves relative to the guide to move the door between the closed position 62 (shown in FIG. 4) and the plurality of open positions 66, 68 (shown in FIGS. 5 and 6), the lever assembly 30 is adapted to maintain the handle 26 sufficiently close to the guide 24 such that the bolt is operative to slide against the guide, and move relative to the handle responsive to changes in distance between the guide and handle. Thus, the bolt will slide into and out of the recesses 36 (e.g., detents) in the guide surface 34 as the handle moves in a path along and spaced apart from the guide surface 34.

As discussed previously, the direction of the opening of the door 18 of the vent depends on which side of the guide 24 that the handle is moved. When the bolt is positioned to extend in the detent in the apex of the guide (shown in FIG. 7), the door is in the closed position (as shown in FIG. 4). In addition, as shown in FIG. 5, the exterior face 14 of the screen includes a first side 58 and an opposed second side 60. When the bolt is positioned to extend in a detent on the first side 50 of the guide, the door is in one of the plurality of open positions and extends outwardly from the second side 60 of the screen at an acute angle 66 with respect to the screen. Correspondingly as shown in FIG. 6, when the bolt is positioned to extend in a detent of the second side 52 of the guide, the door is in one of the plurality of open positions and extends outwardly from the first side 58 of the screen at an acute angle 68 with respect to the screen 12. In these example embodiment, when the door is in an open position, an edge of the door or interior surface adjacent an edge of the door (e.g. surface 100 shown in FIG. 3) may be in contact with a portion of the screen and/or frame.

In addition, it should be noted that the angles 66 and 68 at which the door 18 opens with respect to the screen, depends on which detent the bolt extends into along the sides 50, 52 of the guide. Also, it is to be understood that the configuration of the guide surface and other geometries of the vent described herein is only an example, and that alterative embodiments may have alternative configurations (e.g., different arrangement of the detents, handle, bolt, screen, door, lever assembly, etc.) that result in different angles 66 and 68 for the door with respect to the screen.

Referring back to FIG. 5, an example configuration of the lever assembly 30 is illustrated. In this example, the lever assembly includes a first lever 80 and a second lever 82. The first lever may be in rigid connection with the handle 26 and extends outwardly from the handle in the first direction 74. The second lever 82 is in pivoting connection with first lever 80 at a first pivot position 84 on the first lever that is spaced apart from the handle 26. In addition, the second lever 82 is in pivoting connection with the guide 24 at a second pivot position 86 on the guide that is spaced apart from the first pivot position 84 on the second lever 82.

Figure 15:
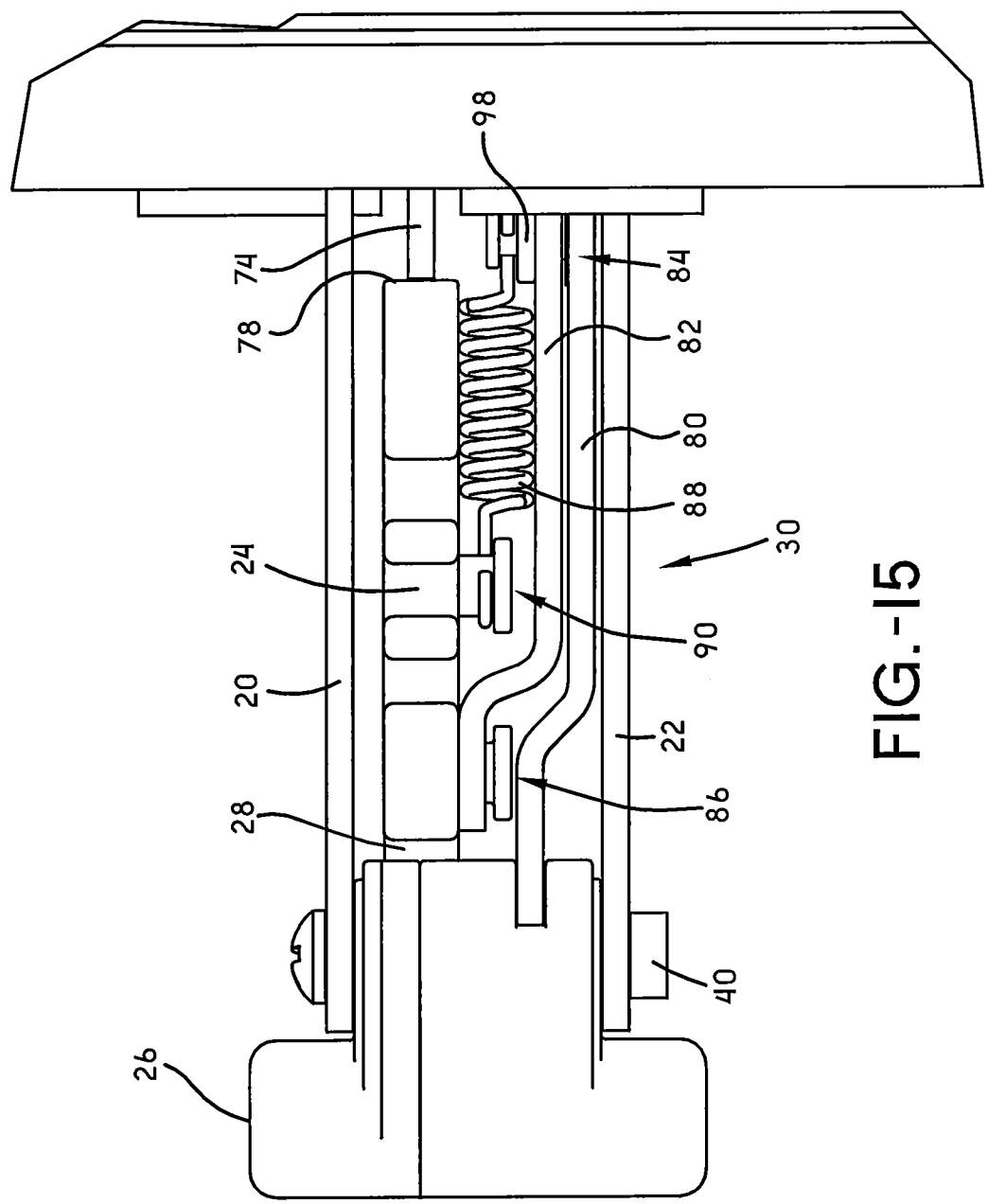
FIG. 15 is a plan view of the handle and lever assembly.

FIG. 15 shows a side view of the level assembly 30. As shown in FIG. 15, the level assembly 30 may include a biasing member such as a spring 88 extending between the first pivot position 84 and a third pivot position 90 on the guide 34 that is spaced apart from the second pivot position 86 on the guide. As shown in FIG. 7, the second pivot position 86 is located on the guide 24 adjacent the apex 46 and centered between the first and second sides 50, 52. Also the third pivot position 90 (to which the spring is mounted) is located between the second pivot position 86 and the base 48 centered between the first and second sides 50, 52.

In these example embodiments, a described pivot location corresponds to the position of the axis at which the described elements pivot with respect to each other. Pins, rivets, shafts, screws, bolts, or any other device operative to enable the elements to pivot with respect to each other may be used to connect the elements. In addition, such devices may be adapted to accommodate the attachment of other elements at the pivot location. For example, as shown in FIG. 15, a shoulder rivet 98 may be used to provide a pivoting connection between the first lever 80 and the second lever 82 as well as provide a shoulder for an end of the spring 88 to be mounted.

Figure 33:
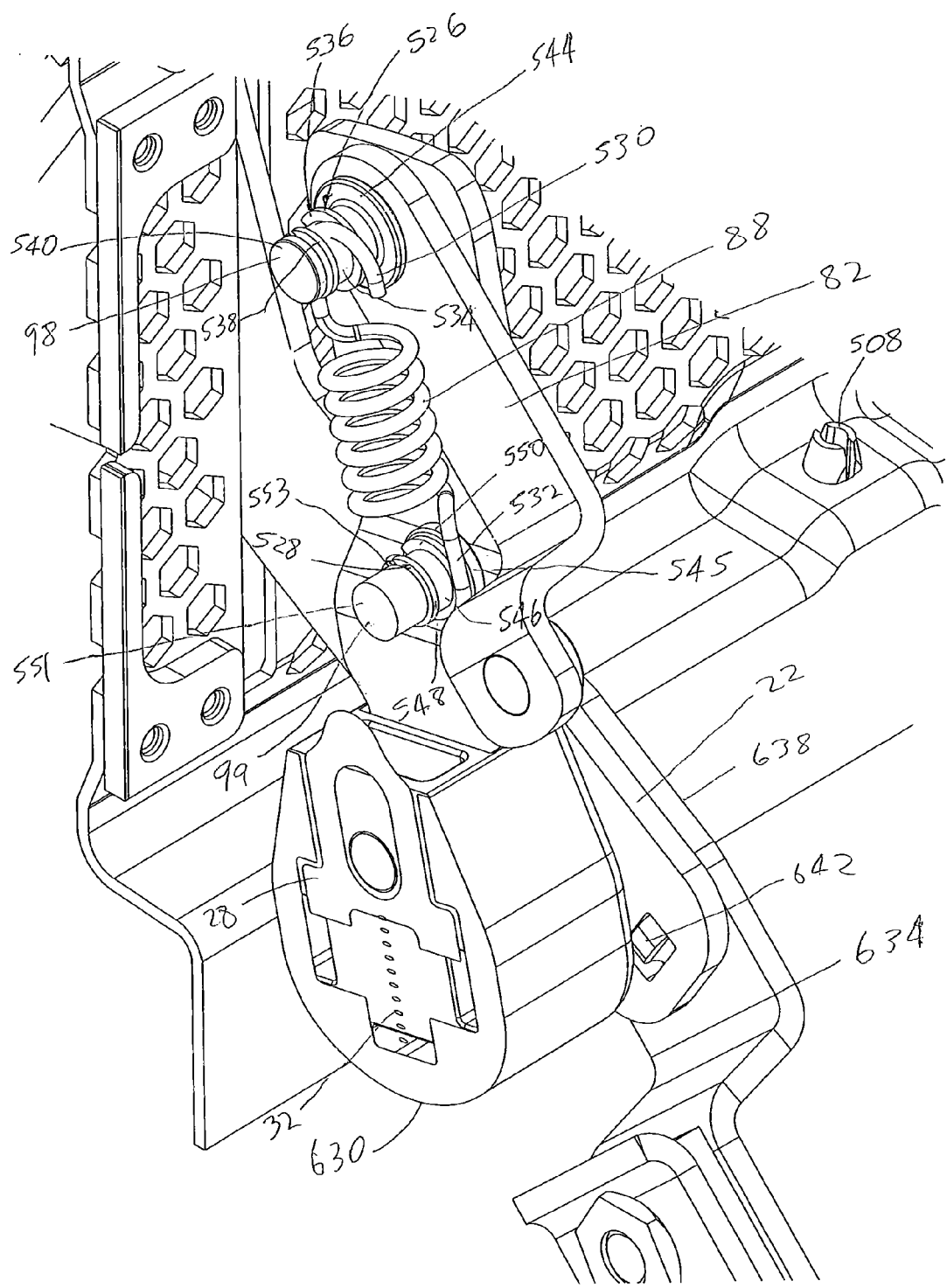
FIG. 33 is a top and back perspective view of a portion of the vent of FIG. 25, showing the spring connected to the shoulder rivets and showing other related elements.
Figure 38:
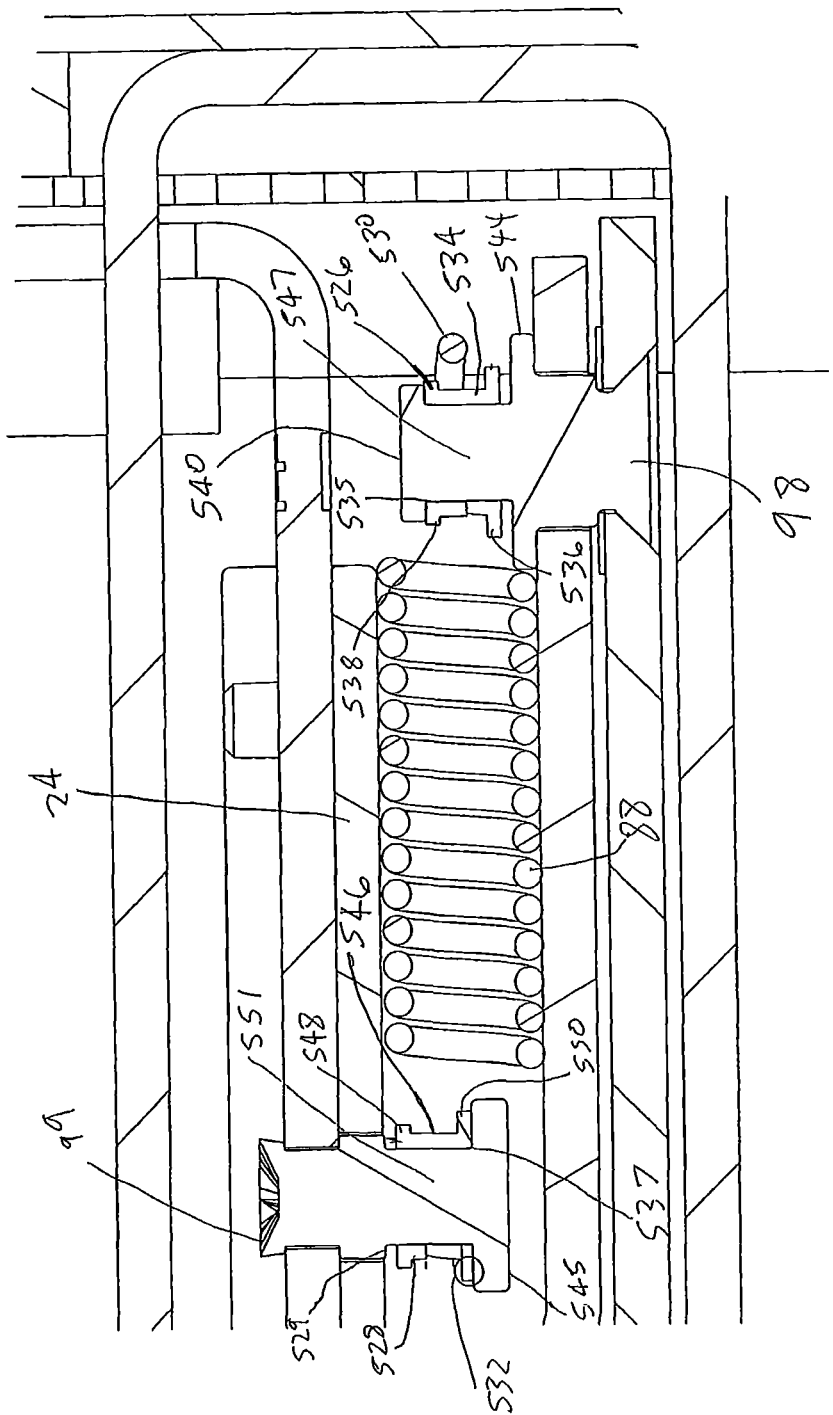
FIG. 38 is a partial sectional view taken along line 38-38 of FIG. 35.

As best seen in FIGS. 31-33 and 38, bushings 526, 528 may be provided on their respective shoulder rivets 98, 99 to reduce the wear on the respective hooked ends 530, 532 of the spring 88. The bushings 526, 528 are shown in FIGS. 31-33 and 38, which depict another exemplary embodiment of a vent apparatus 600 with an alternative handle assembly 626. However, it should be noted that the bushings 526, 528 may also be included in the exemplary embodiments of FIGS. 1-19. As seen in FIGS. 33 and 38, the bushing 526 is cylindrically shaped and includes a shank portion 534 and inner and outer support flanges 536, 538 (with respect to the shoulder rivet 98) located on opposite axial ends of the bushing 526. The diameter of each of the support flanges 536, 538 is larger than the diameter of the shank portion 534. The flanges 536, 538 function to positively locate the bushing 526 when it is installed and also provide a thrust bearing surface. The bushing 526 includes a bore 535 (FIG. 38) that extends axially from the inner flange 536 to the outer flange 538.

The rivet 98 is grooved to slidingly receive the bushing 526. In particular, when the bushing 526 is secured to the shoulder rivet 98, shank 547 (FIG. 38) of the shoulder rivet 98 extends through the bore 535, and the outer flange 538 is positioned adjacent the inner surface of head 540 of the shoulder rivet 98. The inner flange 536 of the bushing 526 is positioned adjacent a shoulder 544 of the rivet 98, which shoulder 544 abuts the second lever 82. The bushing 526 includes a slit 542 (FIG. 32) that allows the bushing 526 to be moved apart to receive the shoulder rivet 98 in order to slip it on the rivet 98 during installation. The hooked end 530 of the spring 88 engages the shank 534 of the bushing 526 between the flanges 536, 538. The bushing 526 is allowed to rotate about the shank 547 of the shoulder rivet 98. This rotation movement or floating of the bushing aids in reducing the wear on the spring end 530 and bushing 526. As depicted by the Figures, the length of the bushing 526 is smaller than the distance between the shoulder 544 and head 540 of the rivet 98. This allows the bushing 526 to move axially along the shank 547 between the head 540 and shoulder 544, which limit the bushing's movement. This additional axial space also provides for tolerances to accommodate different sized bushings 526 and shoulder rivets 98.

As seen in FIGS. 33 and 38, the bushing 528 is also cylindrically shaped and includes a shank portion 546 and inner and outer support flanges 548, 550 (with respect to the shoulder rivet 99) located on opposite axial ends of the bushing 528. The diameter of each of the support flanges 548, 550 is larger than the diameter of the shank portion 546. The flanges 548, 550 function to positively locate the bushing 528 when it is installed, and also provide a thrust bearing surface. The bushing 528 includes a bore 537 (FIG. 38) that extends axially from the inner flange 548 to the outer flange 550. The rivet 99 is grooved to slidingly receive its bushing 528. In particular, when the bushing 528 is secured to the shoulder rivet 99, shank 551 of the shoulder rivet 99 extends through the bore 537, and the outer flange 550 is adjacent the inner surface of head 545 of the shoulder rivet 99. As seen in FIG. 38, the inner flange 548 of the bushing 528 is adjacent a shoulder 529 of the rivet 99 near the detent cover 24.

The bushing 528 includes a slit 553 (FIG. 33) that allows the bushing 528 to be moved apart to receive the shoulder rivet 99 in order to slip it on the rivet 99 during installation. The hooked end 532 of the spring 88 engages the shank 546 of the bushing 528 between the flanges 548, 550. The bushing 528 is allowed to rotate about the shank 551 of the shoulder rivet 99. This rotation movement or floating of the bushing 528 aids in reducing the wear on the spring end 532 and bushing 528. As depicted by the Figures, the length of the bushing 528 is smaller than the distance between the shoulder 529 and the head 545 of the rivet 99. This allows the bushing 528 to move axially along the shank 551 between the head 545 and shoulder 529, which limit the bushing's movement. This additional axial space provides for tolerances to accommodate different sized bushings 528 and shoulder rivets 99. Alternatively, the bushings 526, 528 may be received by their respective hooked ends 530, 532 of the spring 88 instead of the shoulder rivets 98, 99. The bushing 526, 528 and/or spring ends 530, 532 would be configured to allow the bushings 526, 528 to be movably connected to the spring ends 530, 532.

The bushings 526, 528 are made of a durable low friction material such as nylon. Other suitable durable and low friction plastic or metal material may also be used. The bushings reduce the wear on the hooked ends 530, 532 of the spring 88. For example, without the bushings, the hooked end 532 of the spring 88 at the shoulder rivet 99 for the detent cover 24 fractured after twenty five percent of the industry standard cycle life of the spring 88. A spring failure analysis was performed both chemically and visually on the failed spring. The visual evidence indication that some of the spring's cross section area in contact with the rivet 99 was being worn away from high friction metal on metal contact. When grease was applied to the shoulder rivet 99 for the detent cover 24, the hooked end 530 of the spring 88 at the non greased shoulder rivet 98 for the second lever 82 failed after twenty five percent of the industry standard cycle life of the spring 88. In particular, the spring failure indicated that the wear on the hook end 530 was creating a weak point of reduced cross section and leading to failure. When the plastic bushing 528 was installed on the shoulder rivet 99 of the detent cover 24, the hooked end 530 of the spring 88 at the shoulder rivet 98 (without the bushing) for the second lever 82 failed after fifty percent of the industry standard cycle life of the spring 88. In particular, the spring failure indicated that the wear on the hook end 530 was creating a weak point of reduced cross section and leading to failure. When both of the plastic bushings 526, 528 were installed on their respective shoulder rivets 98, 99, spring failure occurred in a different area (near the radius that starts into the body coils of the spring) from that of the above-mentioned tests after one hundred percent of the industry standard cycle life of the spring 88. Close inspections of the bushings showed no failure of the bushings and a slight grooved cross section, but with no areas that were completely worn through.

In another exemplary embodiment, the bushings may be semi-race track shaped to minimize movement of the hooked ends 530, 532 of the spring 88 against the surface of the bushing and thereby reduce the wear on the bushing. In particular, as seen in FIGS. 44-47, the bushing 526' includes a shank portion 534' and inner and outer support flanges 536', 538' (with respect to the shoulder rivet 98) located on opposite axial ends of the bushing 526'. The shank portion 534' is semi-race track shaped and includes an arcuate portion 850 (FIGS. 44, 45, and 47) and flattened or straight leg portions 852, 854 (FIGS. 45 and 47) extending from the ends of the arcuate portion 850. The leg portions 852, 854 are parallel with respect to each other. The support flanges 536' 538' also are also semi-race track shaped. Each of the flanges also includes an arcuate portion 856 (FIGS. 44, 45, and 47) and straight leg portions 858, 860 (FIGS. 45 and 47) extending from the ends of the arcuate portion 856. The leg portions 858, 860 are also parallel with respect to each other. The perimeter of each of the support flanges 536', 538' is larger than the perimeter of the shank portion 534'. The flanges 536', 538' function to positively locate the bushing 526' when it is installed and also provide a thrust bearing surface. The bushing 526' includes a bore 535' (FIGS. 46 and 47) that extends axially from the inner flange 536' to the outer flange 538'.

Figure 43:
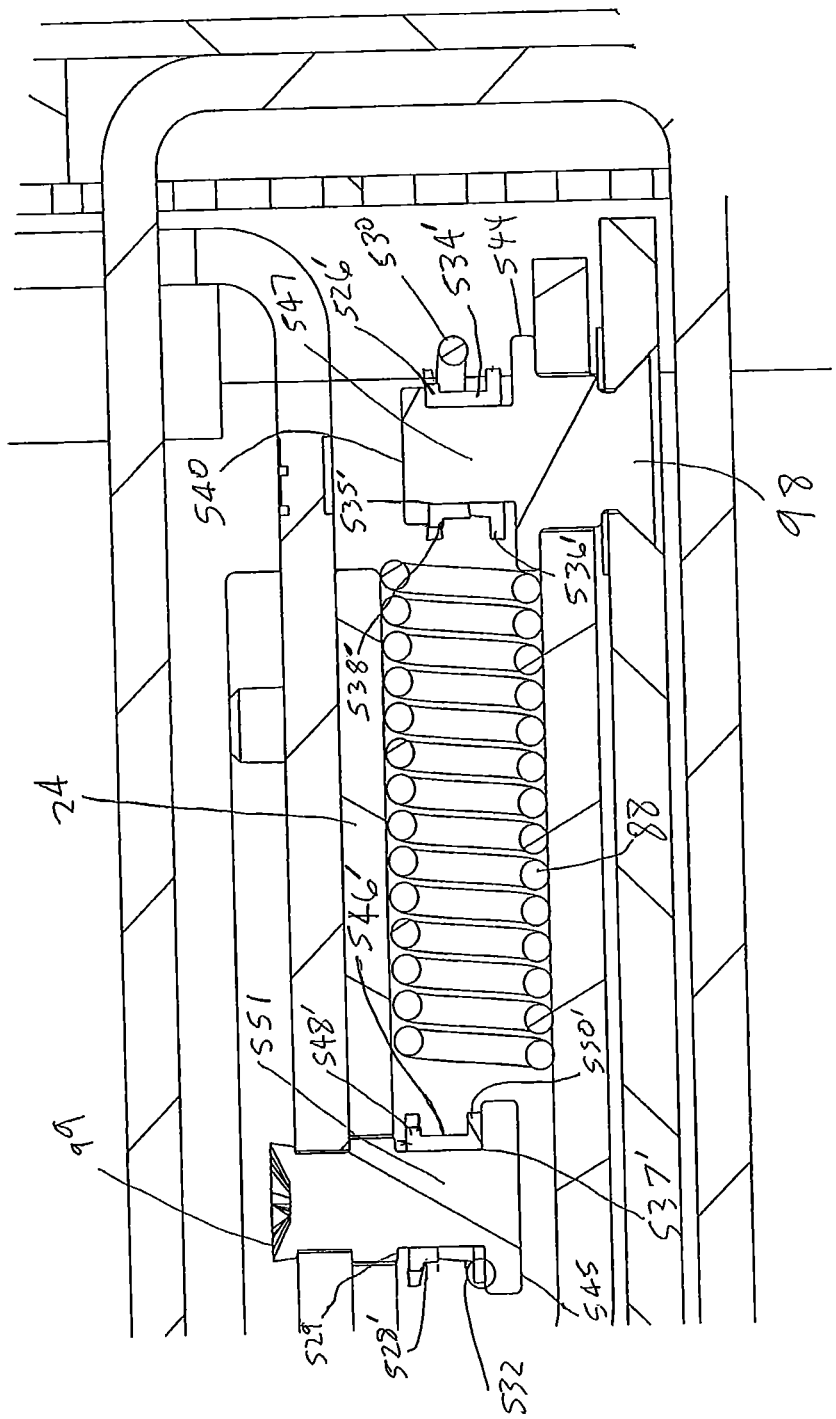
FIG. 43 is a view similar to FIG. 38 except that it is of another exemplary embodiment showing alternative bushings.
Figure 47:
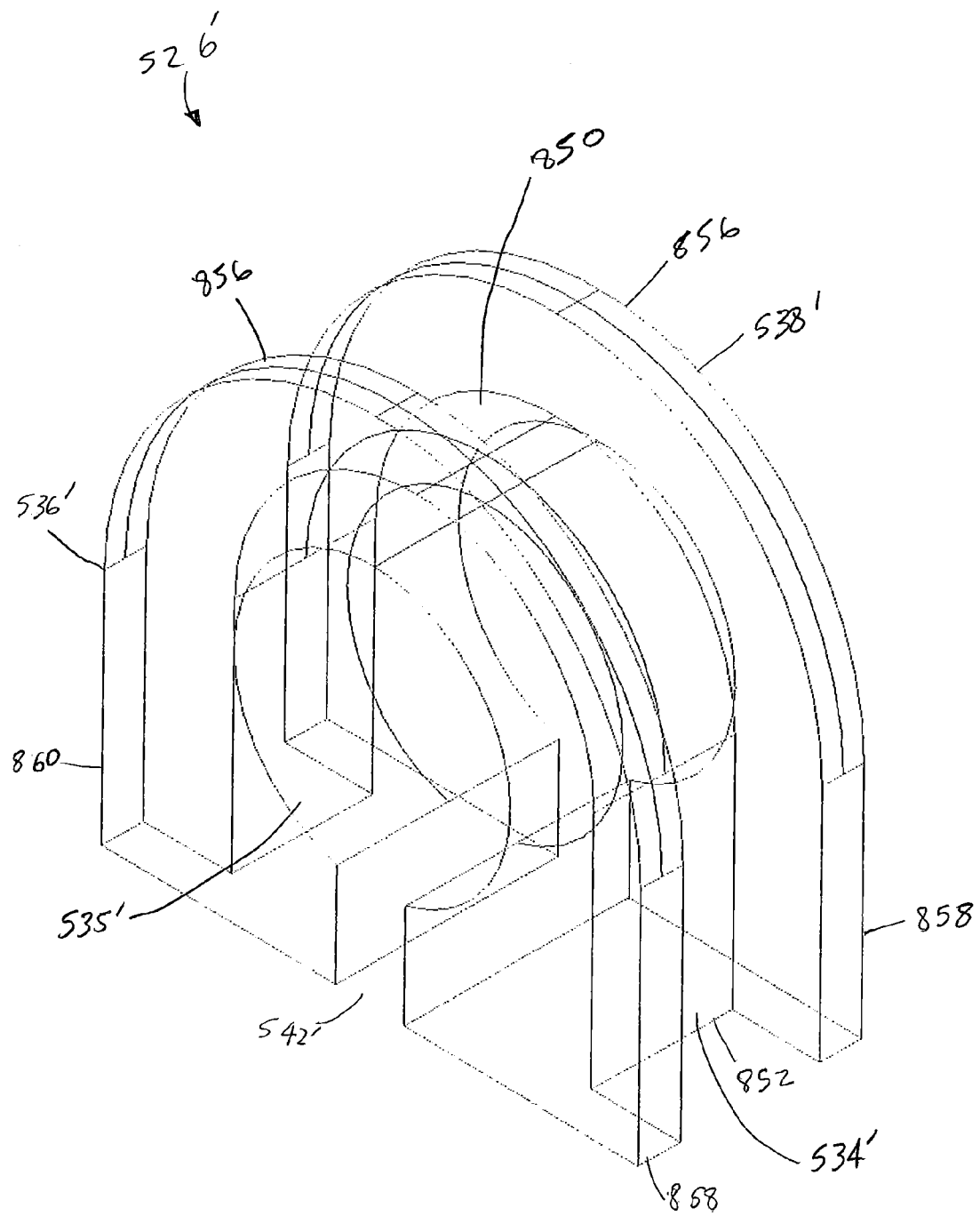
FIG. 47 is a perspective view of the bushing of FIG. 45 facing the lower flange of the bushing.
Figure 51:
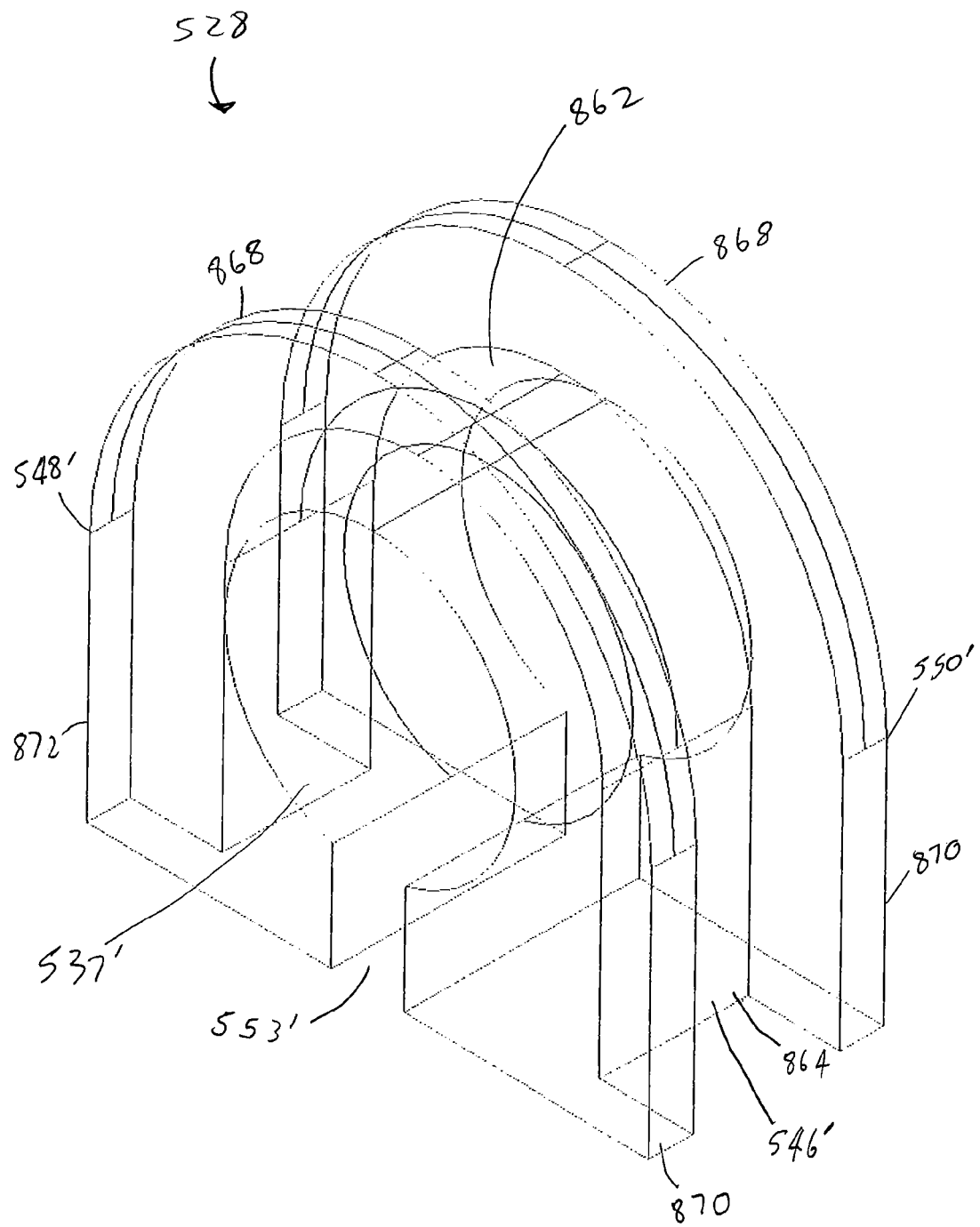
FIG. 51 is a perspective view of the bushing of FIG. 49 facing the lower flange of the bushing.

The rivet 98 is grooved to slidingly receive the bushing 526' as seen in FIGS. 43, 54, and 55. In particular, when the bushing 526' is secured to the shoulder rivet 98, shank 547 (FIG. 43) of the shoulder rivet 98 extends through the bore 535', and the outer flange 538' is positioned adjacent the inner surface of head 540 of the shoulder rivet 98. The inner flange 536' of the bushing 526' is positioned adjacent a shoulder 544 of the rivet 98, which shoulder 544 abuts the second lever 82. The bushing 526' includes a slit 542' that allows the bushing 526' to be moved apart to receive the shoulder rivet 98 in order to slip it on the rivet 98 during installation. The hooked end 530 of the spring 88 engages the arcuate portion 850 and the leg portions 852, 854 of the shank 534' of the bushing 526' between the flanges 536', 538' as shown in FIGS. 45 and 55. The straight leg portions 852, 854 of the shank 534' significantly reduce movement of the hooked end 530 of the spring 88 against the shank 534' of the bushing 526' as compared to the circular shank 534 of the bushing 526 of the previous embodiment. Thus, wear on the spring 88 and the shank 534' at their area of contact is reduced or minimized during the opening and closing of the door. Alternatively, the hooked end of the spring may engage the arcuate portion 850 and only the one leg portion 852. Like the bushing 526, the bushing 526' is allowed to rotate about the shank 547 of the shoulder rivet 98. This rotation movement or floating of the bushing aids in reducing the wear on the spring end 530 and bushing 526'.

As depicted by the Figures, the length of the bushing 526' is smaller than the distance between the shoulder 544 and head 540 of the rivet 98. This allows the bushing 526' to move axially along the shank 547 between the head 540 and shoulder 544, which limit the bushing's movement. This additional axial space also provides for tolerances to accommodate different sized bushings 526' and shoulder rivets 98. The bushing 526' is made of flexible plastic or other suitable flexible material such as rubber.

As depicted in FIGS. 43 and 48-51, the bushing 528' also includes a shank portion 546' and inner and outer support flanges 548', 550' (with respect to the shoulder rivet 99) located on opposite axial ends of the bushing 528'. The shank portion 546' is semi-race track shaped and includes an arcuate portion 862 (FIGS. 48, 49, and 51) and flattened or straight leg portions 864, 866 (FIGS. 49 and 51) extending from the ends of the arcuate portion 862. The leg portions 864, 866 are parallel with respect to each other. The support flanges 548', 550' also are also semi-race track shaped. Each of the flanges 548', 550' also includes an arcuate portion 868 (FIGS. 48, 49, and 51) and straight leg portions 870, 872 (FIGS. 49 and 51) extending from the ends of the arcuate portion 868. The leg portions 870, 872 are also parallel with respect to each other. The perimeter of each of the support flanges 548', 550' is larger than the perimeter of the shank portion 546'. The flanges 548', 550' function to positively locate the bushing 528' when it is installed and also provide a thrust bearing surface. The bushing 528' includes a bore 537' (FIGS. 50 and 51) that extends axially from the inner flange 548' to the outer flange 550'.

The rivet 99 is grooved to slidingly receive the bushing 528' as seen in FIGS. 43, 54, and 55. In particular, when the bushing 528' is secured to the shoulder rivet 99, shank 551 (FIG. 43) of the shoulder rivet 99 extends through the bore 537', and the outer flange 550' is positioned adjacent the inner surface of head 545 of the shoulder rivet 99. The inner flange 548' of the bushing 528' is positioned adjacent a shoulder 529 of the rivet 99, which shoulder 529 abuts the second lever 82. The bushing 528' includes a slit 553' that allows the bushing 528' to be moved apart to receive the shoulder rivet 99 in order to slip it on the rivet 99 during installation. The hooked end 532 of the spring 88 engages the arcuate portion 862 and leg portions 870, 872 of the shank 546' of the bushing 528' between the flanges 548', 550' as shown in FIG. 49. The straight leg portions of the shank 546' significantly or substantially reduce movement of the hooked end 532 of the spring 88 against the shank 546' of the bushing 528' as compared to the circular shank 546 of the bushing 528 of the previous embodiment. Thus, wear on the spring 88 and the shank 546' at their area of contact is reduced during the opening and closing of the door. Alternatively, the hooked end of the spring may engage the arcuate portion 862 and only the one leg portion 872. Like, the bushing 528, the bushing 528' is allowed to rotate about the shank 551 of the shoulder rivet 99. This rotation movement or floating of the bushing 528' aids in reducing the wear on the spring end 532 and bushing 528'.

As depicted by the Figures, the length of the bushing 528' is smaller than the distance between the shoulder 529 and head 545 of the rivet 99. This allows the bushing 528' to move axially along the shank 551 between the head 545 and shoulder 529, which limit the bushing's movement. This additional axial space also provides for tolerances to accommodate different sized bushings 528' and shoulder rivets 99. The bushing is made of flexible plastic or other suitable flexible material such as rubber. In all other aspects, the exemplary embodiment of this vent with these bushings 526', 528' is similar in structure and function to that of the previously mention embodiments of the vent. FIG. 54 shows the bushings 526', 528' in the exemplary embodiment of the vent apparatus 600 with an alternative handle assembly 626. However, it should be noted that the bushings 526', 528' may also be included in the exemplary embodiments of FIGS. 1-19.

In example embodiments, the configuration of the lever assembly is operative to require a sufficient amount of force to initially move the bolt from the apex of the guide to a side of the guide (to open the vent door) in order to provide a default resistance to movement of the door that enables a tight weather resistant seal between the door and screen. However, once the door is opened and the bolt is positioned along the sides of the guide, the amount of force necessary to move the door at different angles (by sliding between different adjacent detents) is relatively less than the initial force to open the door. For example, the lever assembly is adapted to require use of a greater amount of force on the handle to move the bolt from (as shown in FIG. 7) the recess on the apex 46 to the first recess 92 than to move the bolt from the first recess 92 to an adjacent second recess 94.

As described herein, the movable portion of the handle has been referred to as a bolt. However it is to be understood that the use of the term bolt does not imply that this movable portion is a fastener type bolt (e.g., having threads). Rather, as used herein the term bolt encompasses any movable element that provides locking features with respect to the guide. Such locking features for example, include the ability of the bolt (in combination with the spring in the handle) to provide sufficient resistance to being moved out of a detent on the guide, so as to prevent wind forces acting on the door from moving the door to a different angular position with respect to the screen. In alternative embodiments other types of combinations of bolts and/or biasing members may be used to provide such locking features in the handle.

Figure 17:
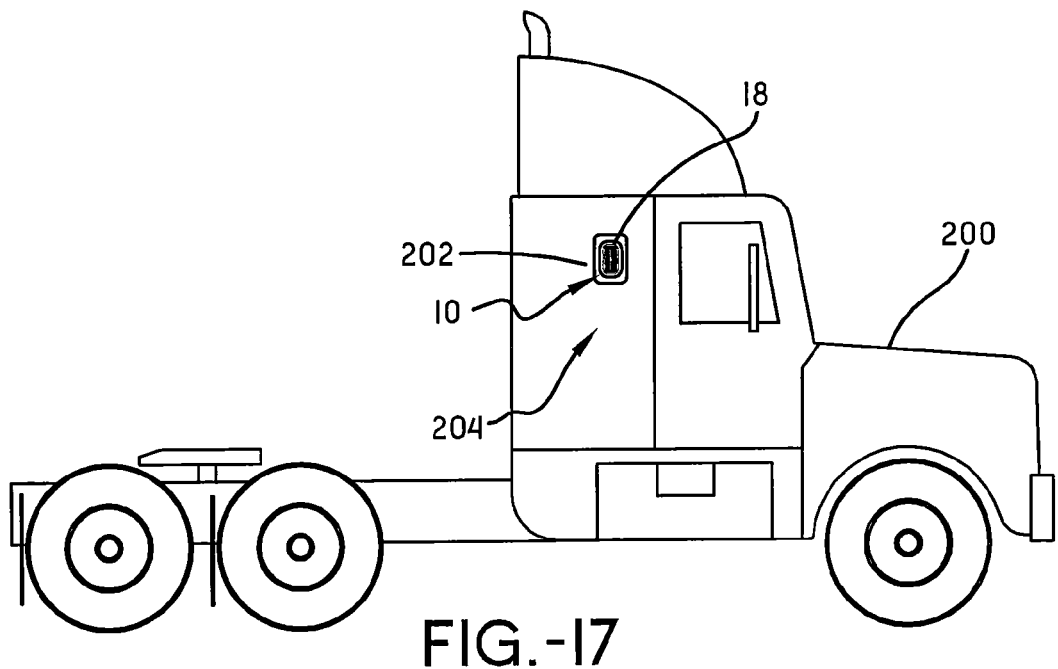
FIG. 17 is a perspective view of a vent mounted in a vehicle.

As discussed previously, embodiments of the described vent may be adapted to be mounted in a vehicle. FIG. 17 illustrates an example of a vehicle 200 that may include the described vent. Here the vehicle may include an exterior wall 202 (such as wall of the cab of the vehicle). Such a wall may be manufactured and/or modified to include an opening 204 in the wall through which the vent 10 may be mounted with the door 18 facing an area outside the vehicle. However, it is to be understood that the described vent may be used in other types of applications, such as a vent for a room of a building, or any other application that requires a vent.

Figure 16:
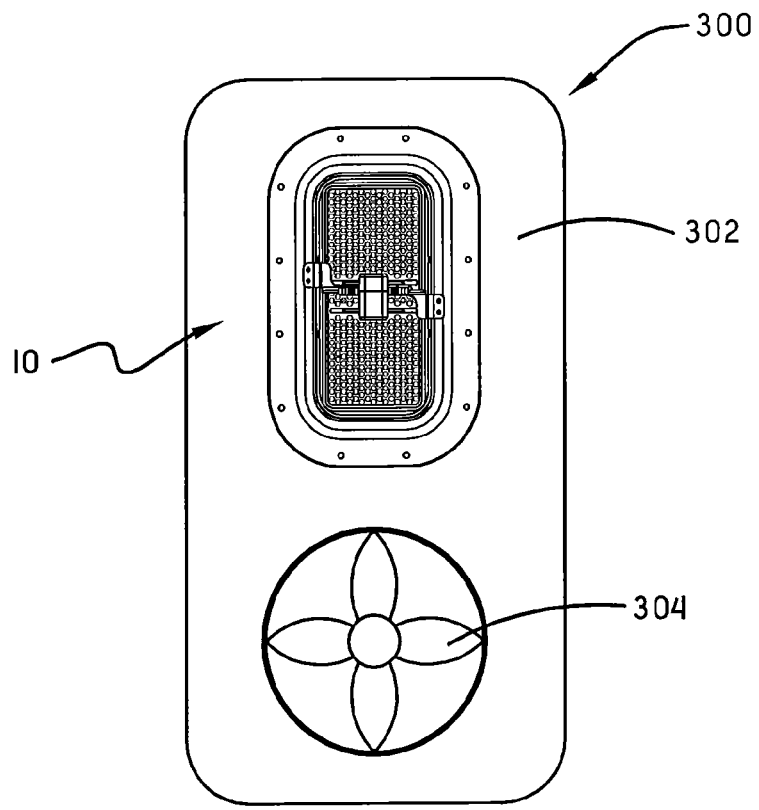
FIG. 16 is a back side view of a vent mounted in combination with a fan.
Figure 18:
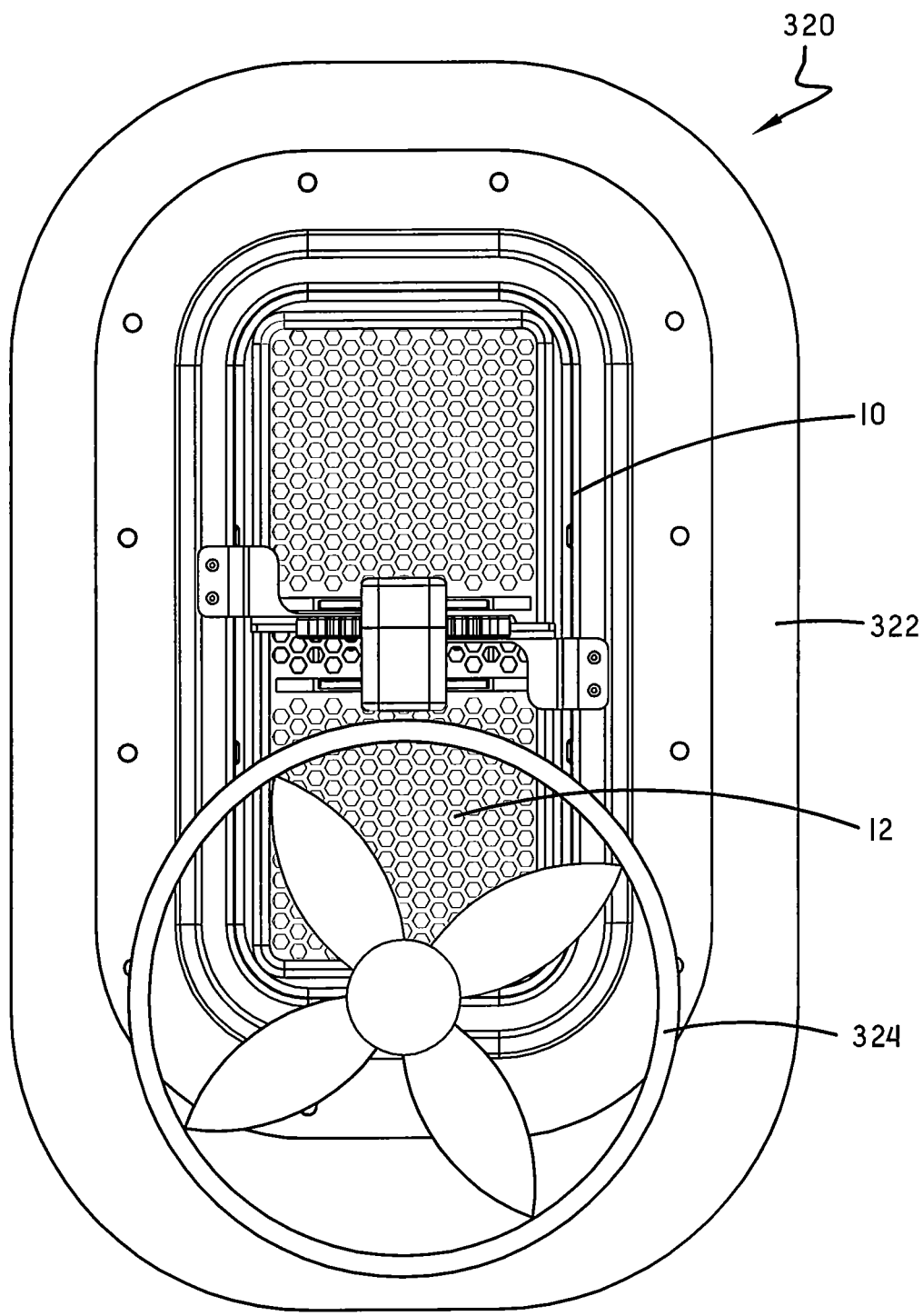
FIG. 18 is a back side view of an alternative configuration of a vent mounted in combination with a fan.

In addition, alternative embodiments of the described vent may be combined with other types of cooling elements. For example, as schematically shown in FIG. 16, an example vent apparatus 300 may include a frame 302 that is adapted to have an electric fan 304 mounted adjacent the manually operated vent 10 described previously. Also for example, as shown in FIG. 18, an example vent apparatus 320 may include a frame 322 that is adapted to have an electric fan 324 mounted to traverse (i.e. overlap) portions of the interior face of the screen 12 of the manually operated vent 10 described previously.

Figure 26:
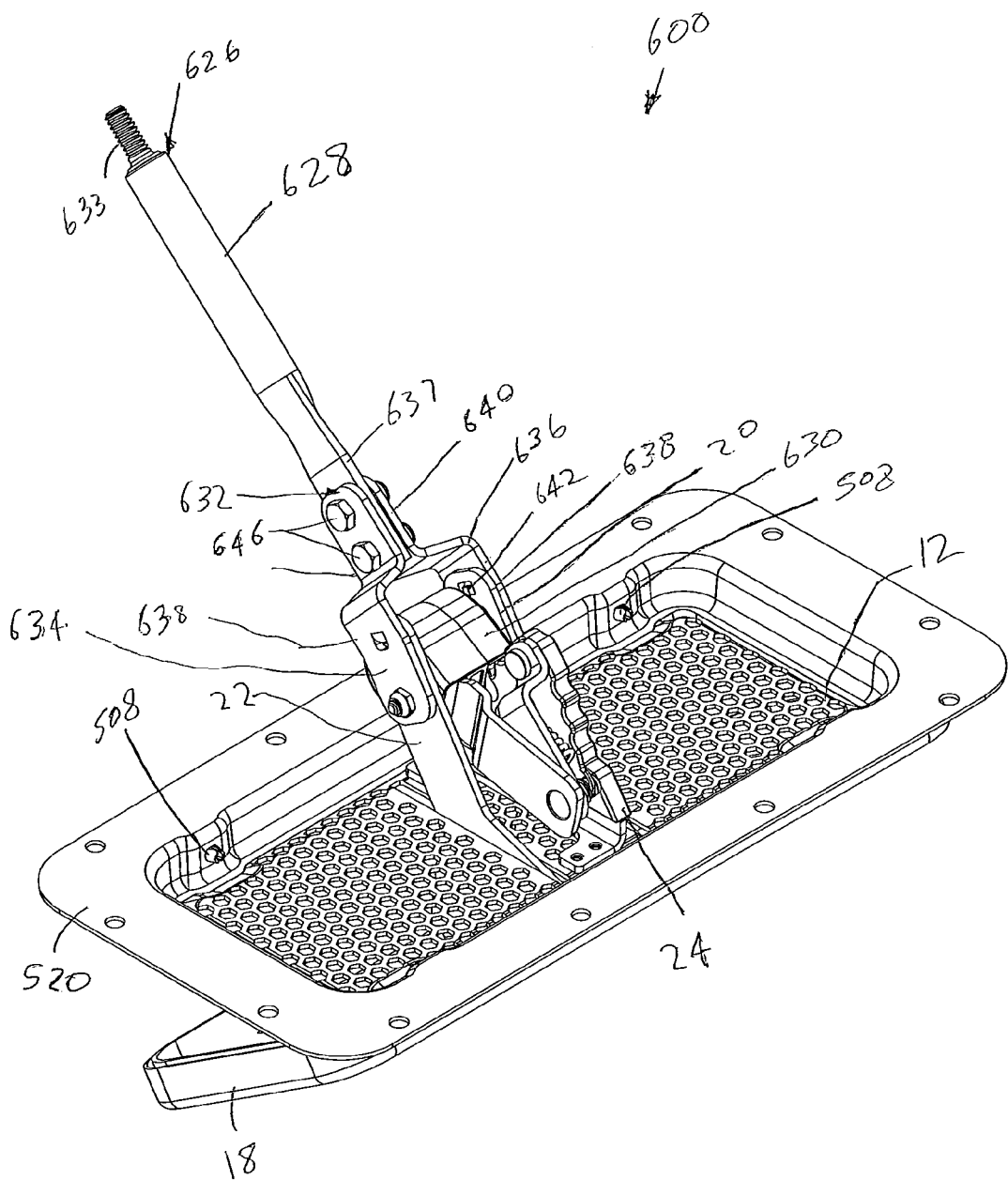
FIG. 26 is a back and bottom perspective view of the exemplary embodiment of FIG. 25.
Figure 27:
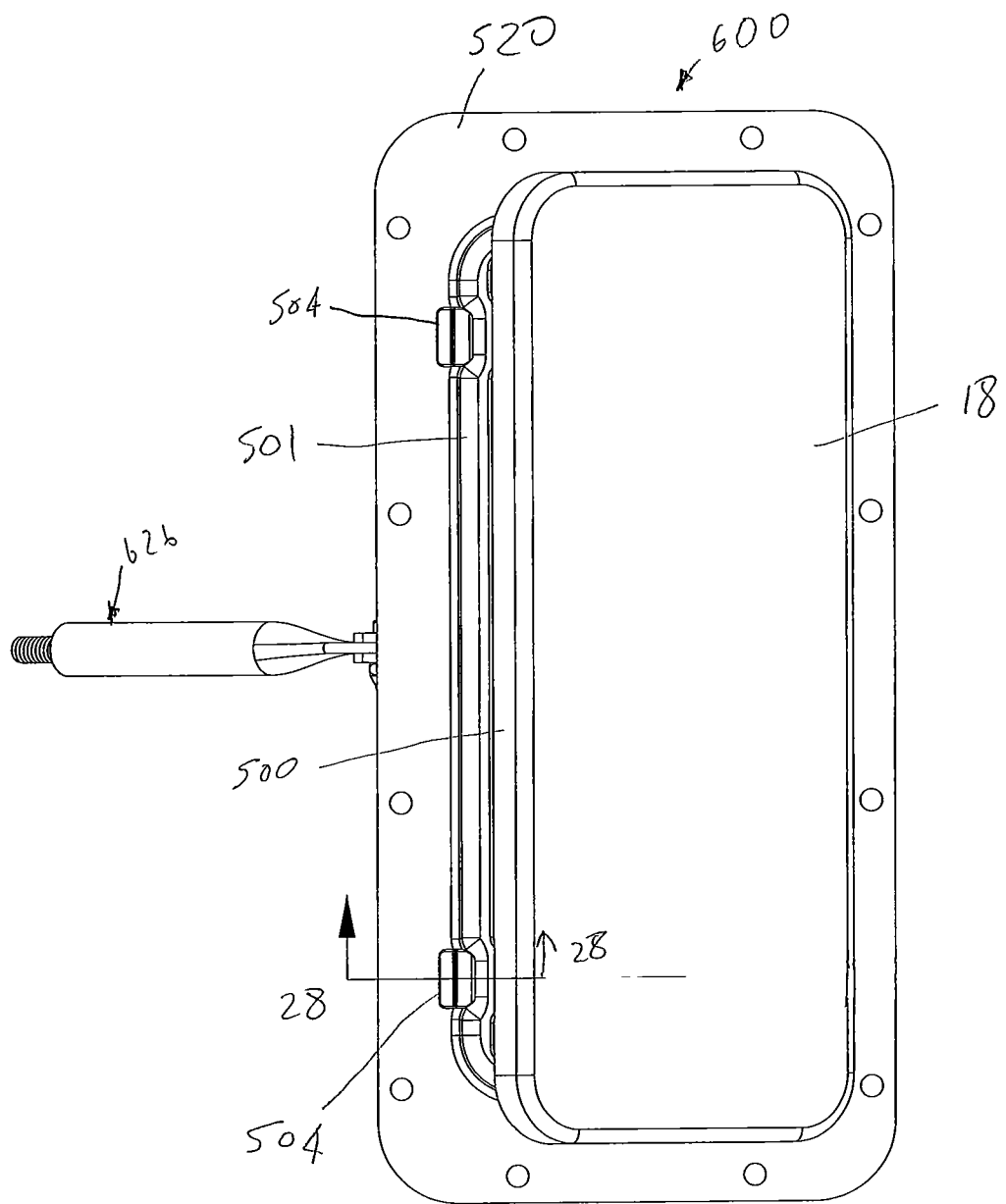
FIG. 27 is a front perspective view of the exemplary embodiment of FIG. 25.

FIGS. 25-35 show another exemplary embodiment of a vent apparatus 600 that includes an alternative handle 626 that requires less force to cause the door 18 to move between the closed position 62 and open positions 64, 65. The vent apparatus is similar 60 in all other aspects to the vent apparatus 10 except for that discussed below. Referring to FIG. 26, the handle 626 includes an elongated handle bar 628, handle lug 630, and handle bracket 632. The handle bar 628 includes a distal end 633 that is threaded to allow attachment of a grip or other suitable device. The handle bar 628 includes a flange 637 at its proximal end. The handle bar 628 may be comprised of a suitable hard material such as steel.

The handle lug 630 is in pivoting connection with the two spaced apart arms 20, 22. Like the handle 26 in the previously mentioned embodiment, the lug 630 includes the moveable bolt 28 (FIG. 33) that is operative to project from the lug 630, and also the biasing member 32 (schematically shown in FIG. 33) that is operative to urge the bolt 28 to move in the first direction relative to the lug 630.

The handle bracket 632 is generally Y-shaped and comprises first and second elongated bars 634, 636. Each bar includes a first end 638 and a second end 640 that is offset from the first end. The first end 638 includes a projection 642 that extends inwardly. The projection 642 may be formed by machine punching the first end 638, or in other suitable ways. The handle bracket 632 pivotally connects the handle bar 628 to the handle lug 630, and fixedly or rigidly connects the handle bar to the arms 20, 22. In particular, the first end 638 of the first bar 634 is positioned on the arm 22, and the first end 638 of the second bar 636 is positioned on the arm 20. As seen in FIG. 31, the pin 40 extends through the first ends 638 of the bars, and a nut 644 is fastened on the pin 40 to connect the first ends 638 of the bars 636, 634 to their respective arms 20, 22 and pivotally connect the first ends 638 of the bars 636, 634 to the lug 630. The projection 642 of the first bar 634 extends through and engages the arm 22 as depicted in FIG. 33 such that the first end 638 of the first bar 634 is fixed to the arm 22. The projection 642 of the second bar 636 extends through and engages the arm 20 such that the first end 638 of the second bar 636 is fixed to the arm 20 as depicted in FIG. 26. The second end 640 of the first bar 634 is positioned on one side of the flange 637, and the second end 640 of the second bar 636 is positioned on the opposite side of the flange 637. A pair of pins 646 extends through the second ends 640 of the bars 634, 636. Nuts 648 (FIG. 34) are fastened on respective pins 646 to fixedly or rigidly connect the second ends 640 of the bars 634, 636 to the flange 633. Other suitable types of fasteners may be used to fasten the bars 634, 636 to the flange 633. Also, instead of the projections 642, other suitable fasteners such as nuts and bolts may be used to fix the arms 20, 22 to their respective first ends 638 of the bars 636, 634.

Thus, as depicted in FIGS. 34 and 35, the handle bar 628 and bracket 632 are fixedly connected to the arms 20, 22 and move with the arms 20, 22 when the door 18 moves between an open position (FIG. 34) and the closed position (FIG. 35). Yet, the handle bar 628 is pivotally connected via the bracket 632 to the lug 630 and allows the lug 630 to pivot relative to the handle bar 628. This allows the handle bar 628 to be moved a lesser distance than the lug 630 in order to move the door 18 between the open and closed positions. Since the handle 26 of the previous exemplary embodiment is formed in one piece with the lug, the handle 626 of this embodiment requires less range of movement (as indicated by 660) by the user to open and close the door 18 than is required by the handle 26 of the previous exemplary embodiment. Also, due to the elongated bar 628, less force is required to move the door 18 between the open and closed positions. The handle 626 is similar in function and structure in all other aspects to that of the handle 26 in the previous example embodiment.

Figure 36:
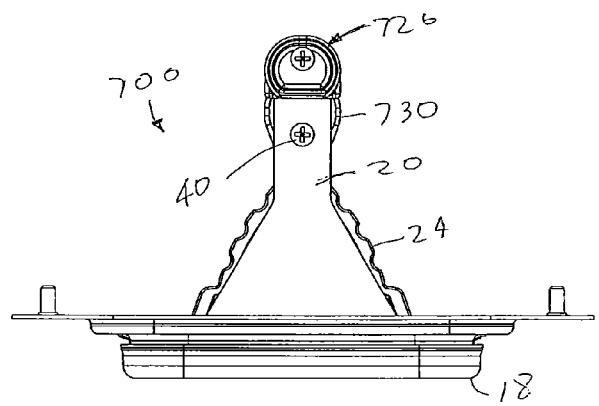
FIG. 36 is a top view of another exemplary embodiment of a vent.
Figure 37:
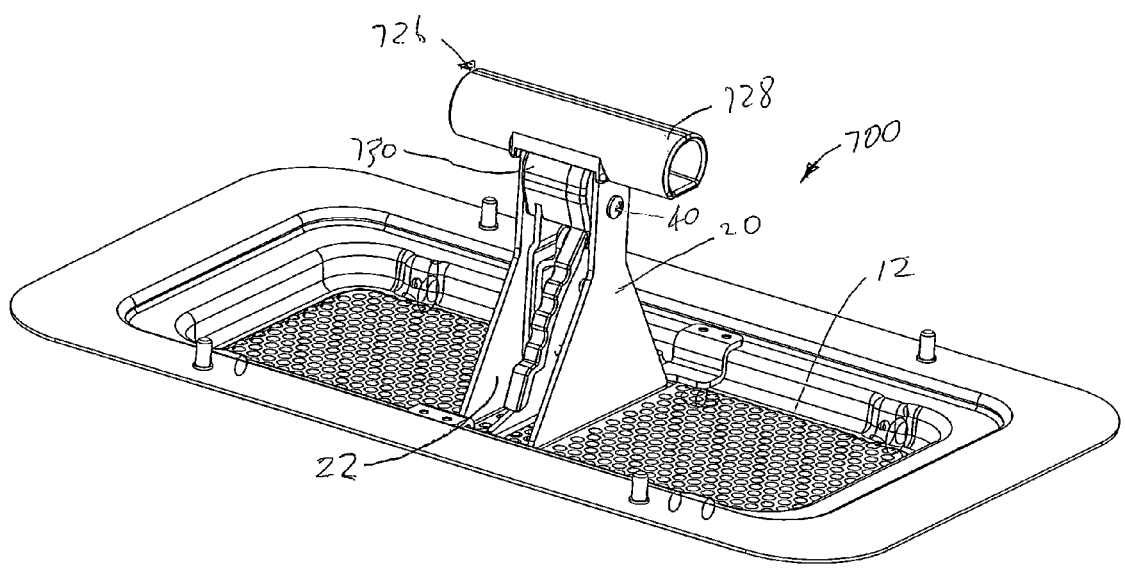
FIG. 37 is a back and top perspective view of the vent of FIG. 36.

FIGS. 36 and 37 show another embodiment of an vent apparatus 700 with an alternative handle 726. The handle 726 includes a vertical hand grip 728 and a handle lug 730. The handle lug 730 is similar to the handle lug 630, except for that discussed below. The hand grip 728 is elongated in the vertical direction (with respect to FIG. 17). The hand grip 728 is fixedly connected to arms 20, 22. Thus, the hand grip 728 moves with the arms 20, 22 but moves relative to the handle lug 730 when the door 18 moves between the open position (FIG. 34) and the closed position (FIG. 35). Alternatively, the hand grip 728 may be fixedly connected to the handle lug 730 instead of the arms 20, 22 and move with the lug 730. The vent apparatus 700 is similar in all other aspects to the vent apparatus 600.

In the foregoing description, certain terms have been described in example embodiments for purposes of brevity, clarity and understanding. However, no unnecessary limitations are to be implied therefrom, because such terms are used for descriptive purposes and are intended to be broadly construed. Moreover, the descriptions and illustrations herein are by way of examples and the embodiment is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Additionally, it may be recognized that the examples provided herein may be permutated while still falling under the scope of the claims.

We claim:

1. A vent apparatus comprising:
   a screen including an interior face, an opposed exterior face, a plurality of perforations therethrough, and at least one slot therethrough;
   a door adjacent the exterior face of the screen, wherein the door includes at least one arm that extends through the at least one slot;
   a handle, wherein the handle is in operative connection with the at least one arm, wherein the handle is operative to cause the door to move between a closed position adjacent the screen to one of a plurality of open positions extending at an acute angle with respect to the screen;
   a guide mounted adjacent the interior face of the screen, wherein the handle is operative to move relative to the guide to move the door between the closed position and the plurality of open positions;

a lever assembly extending from the handle to the guide, wherein the lever assembly is in pivoting connection with the guide, wherein the lever assembly is adapted to maintain the handle sufficiently close to the guide such that a movable portion of the handle is operative to slide along the guide, wherein the lever assembly includes a first lever and a second lever, wherein the first lever is in rigid connection with the handle and extends outwardly from the handle, wherein the second lever is in pivoting connection with the first lever at a first pivot position on the first lever that is spaced apart from the handle, wherein the second lever is in pivoting connection with the guide at a second pivot position on the guide that is spaced apart from the first pivot position; and a spring extending between the first pivot position and a third pivot position on the guide that is spaced apart from the second pivot position, at least a first bushing provided at one of the first pivot position and the third pivot position, wherein the at least first bushing is in contact with an end of the spring.

2. The apparatus according to claim 1, wherein the handle includes a bolt positioned therein, wherein the bolt is operative to move relative to the handle in a first direction from a retracted position to an extended position, wherein the bolt is operative to move relative to the handle in a second direction opposite the first direction relative to the handle from the extended position to the retracted position, wherein the handle includes a biasing member that urges the bolt to move in the first direction relative the handle from the retracted position to the extended position, wherein the guide includes a guide surface, wherein the guide surface includes a plurality of recesses, wherein as the handle moves relative to the guide to move the door between the closed position and the plurality of open positions, the bolt is operative to move relative to the handle and slide into and out of the recesses.

3. The apparatus according to claim 1 including a connector in connection with the guide, wherein the connector receives the first bushing, wherein the first bushing is movable relative to the connector after the first bushing is installed on the connector.

4. The apparatus according to claim 1 wherein the first bushing is provided at the third pivot position and is movable relative to the guide.

5. The apparatus according to claim 4 including a second bushing provided at the first pivot position, wherein the second bushing is movable relative to the first lever.

6. The apparatus according to claim 5 including a first rivet in connection with the guide, wherein the first rivet receives the first bushing, wherein the first bushing is movable relative to the first rivet after the first bushing is installed on the first rivet, a second rivet in connection with the first lever, wherein the second rivet receives the second bushing, wherein the second bushing is movable relative to the second rivet after the second bushing is installed on the second rivet.

7. The apparatus according to claim 1 wherein the first bushing includes structure that comprises a nylon material.

8. The apparatus according to claim 1 wherein the first bushing is configured to substantially reduce movement of the end of the spring relative to the first bushing.

9. The apparatus according to claim 8 wherein the first bushing has a cross section that is semi-racetrack shaped, wherein the first bushing comprises a first portion and a second portion extending from the first portion, wherein the end of the spring is in contact with the first and second portions, wherein the first portion is arcuate and the second portion is straight.

10. The apparatus according to claim 9 wherein the first bushing comprises a third portion extending from the first portion, wherein the end of the spring is in contact with the third portion, wherein the third portion is parallel to the second portion.

11. The apparatus according to claim 1 wherein the perforations are hexagonally shaped, wherein the perforations are sized and arranged to provide the maximum area of open air flow for a given size of the screen.

12. The apparatus according to claim 1 further comprising:
a frame including an opening through the frame;
wherein the screen is mounted to the frame in a position that traverses at least a portion of the opening of the frame; and
at least one bumper located between the door and the frame to at least minimize contact between the door and the frame during movement of the door between the closed and open positions.

13. The apparatus according to claim 12 wherein the at least one bumper comprises one of a nylon, ceramic, and polyoxymethylene or any combination thereof material.

14. The apparatus according to claim 12 further comprising a seal, wherein the seal is positioned between the bumper and the frame.

15. The apparatus according to claim 14 including a rivet, wherein the rivet extends through the frame and the bumper, wherein the rivet is configured to secure the bumper to the frame.

16. The apparatus according to claim 1 further comprising:
at least one bumper located between the door and the screen to at least minimize contact between the door and the screen during movement of the door between the closed and open positions, wherein the at least one bumper comprises one of a nylon, ceramic, and polyoxymethylene or any combination thereof material.

17. The apparatus according to claim 16 further comprising a seal, wherein the seal is positioned between the bumper and the screen, wherein the seal is made of plastic foam.

18. The apparatus according to claim 16, wherein the at least one bumper comprises a nylon and a glass fiber reinforcement material that is configured to withstand a temperature of 450 degrees Fahrenheit for at least one minute, wherein the glass fiber reinforcement material is fifteen percent of the material of the bumper.

19. The apparatus according to claim 3 wherein the connector includes a shank and a head, wherein the head has a larger cross sectional area than a cross sectional area of the shank, wherein the shank receives the first bushing, wherein the first bushing is positioned between the guide and the head.

20. The apparatus according to claim 19 wherein the first bushing has a length that is less than a length of the shank to enable axial movement of the first bushing along the shank.

21. The apparatus according to claim 19 wherein the first bushing has a slit that extends along the length of the bushing to enable the first bushing to be moved apart at the slit and slipped onto the shank.

* * * * *